(12) United States Patent
Nomura et al.

(10) Patent No.: US 7,840,593 B2
(45) Date of Patent: Nov. 23, 2010

(54) PROGRAM, INFORMATION PROCESSING METHOD AND DEVICE, AND DATA STRUCTURE

(75) Inventors: Takashi Nomura, Tokyo (JP); Hiroyuki Tominaga, Kanagawa (JP); Haruhiko Sakata, Kanagawa (JP); Masayuki Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 525 days.

(21) Appl. No.: 10/489,311

(22) PCT Filed: Jul. 30, 2003

(86) PCT No.: PCT/JP03/09632

§ 371 (c)(1),
(2), (4) Date: Mar. 18, 2004

(87) PCT Pub. No.: WO2004/012088

PCT Pub. Date: Feb. 5, 2004

(65) Prior Publication Data

US 2004/0243629 A1    Dec. 2, 2004

(30) Foreign Application Priority Data

Jul. 30, 2002  (JP)  .............................. 2002-221129
Sep. 6, 2002  (JP)  .............................. 2002-260716

(51) Int. Cl.
*G06F 17/30* (2006.01)
(52) U.S. Cl. ................ 707/770; 707/782; 709/201; 709/220; 709/224; 709/227; 709/228
(58) Field of Classification Search ................ 707/200, 707/100, 10, 104.1, 999.001, 999.107, 770, 707/782; 709/201, 220, 224, 227, 228
See application file for complete search history.

(56) References Cited

U.S. PATENT DOCUMENTS

| 5,392,223 | A | * | 2/1995 | Caci ............................ 709/218 |
| 6,046,979 | A | * | 4/2000 | Bauman ...................... 370/229 |
| 6,061,693 | A | * | 5/2000 | Carney et al. ............... 707/200 |
| 6,122,292 | A | * | 9/2000 | Watanabe et al. ........... 370/468 |

(Continued)

FOREIGN PATENT DOCUMENTS

JP    7-219868    8/1995

(Continued)

*Primary Examiner*—Don Wong
*Assistant Examiner*—Thanh-Ha Dang
(74) *Attorney, Agent, or Firm*—Oblon, Spivak, McClelland, Maier & Neustadt, L.L.P.

(57) ABSTRACT

The present invention relates to a program, an information processing method and apparatus, and a data structure with which connection can be formed reliably between apparatuses having different capabilities. A service that can be provided to another party is represented by five dimensional parameters, namely, Access Method, Link Speed, X scale, Y scale, and Audio Codec. The values of the parameters are all represented by integer values. Access Method is represented by number 1 in the case of RTSP/TCP+RTP/UDP, and by number 2 in the case of HTTP tunnelling. Link Speed is normalized by kbps as a base unit, and X scale and Y scale are normalized by 16 pixels as a base unit. Audio Codec supports predetermined methods represented by numbers 0 to 6. The present invention can be applied to a personal computer.

10 Claims, 20 Drawing Sheets

- PROFILE SPACE ID = 10000001
- PARAMETERS
  - access method, bit rate, X scale, Y scale, audio codec
    - access method {1:RTSP/TCP+RTP/UDP, 2:HTTP tunnelling}
    - bit rate {6k~512kbps}
    - X scale {128~352}
    - Y scale {96~288}
    - Video Codec {1:MPEG4}
    - audio codec {0:none, 1:CELP 8k, 2:CELP 16k, 3:AAC 16k, 4:AAC 32k, 5:AAC 44.1k, 6:AAC 48k}

U.S. PATENT DOCUMENTS

| | | | | |
|---|---|---|---|---|
| 6,151,605 | A * | 11/2000 | Costa | 707/101 |
| 6,184,878 | B1 * | 2/2001 | Alonso et al. | 725/109 |
| 6,289,390 | B1 * | 9/2001 | Kavner | 719/310 |
| 6,414,758 | B1 * | 7/2002 | Stovall | 358/434 |
| 6,529,508 | B1 * | 3/2003 | Li et al. | 370/392 |
| 6,577,324 | B1 * | 6/2003 | Palmer et al. | 715/705 |
| 6,643,696 | B2 * | 11/2003 | Davis et al. | 709/224 |
| 6,711,297 | B1 * | 3/2004 | Chang et al. | 382/240 |
| 6,765,873 | B1 * | 7/2004 | Fichou et al. | 370/235 |
| 7,031,254 | B2 * | 4/2006 | Abraham et al. | 370/229 |
| 7,062,253 | B2 * | 6/2006 | Money et al. | 455/406 |
| 7,069,344 | B2 * | 6/2006 | Carolan et al. | 709/250 |
| 7,075,557 | B2 * | 7/2006 | Ludtke et al. | 345/629 |
| 7,180,898 | B2 * | 2/2007 | Yoshida et al. | 370/395.3 |
| 7,437,428 | B1 * | 10/2008 | Muti et al. | 709/219 |
| 7,522,536 | B2 * | 4/2009 | Roberts et al. | 370/252 |
| 2002/0099812 | A1 * | 7/2002 | Davis et al. | 709/224 |
| 2002/0194361 | A1 * | 12/2002 | Itoh et al. | 709/233 |
| 2003/0016630 | A1 * | 1/2003 | Vega-Garcia et al. | 370/252 |
| 2003/0158917 | A1 * | 8/2003 | Andrew et al. | 709/220 |
| 2005/0033806 | A1 * | 2/2005 | Harvey et al. | 709/204 |
| 2007/0086485 | A1 * | 4/2007 | Vega-Garcia et al. | 370/468 |

FOREIGN PATENT DOCUMENTS

| | | |
|---|---|---|
| JP | 2001-265645 | 9/2001 |
| JP | 2001-344200 | 12/2001 |
| JP | 2002-063109 | 2/2002 |

* cited by examiner

FIG. 8

- PROFILE SPACE ID = 10000001
- PARAMETERS
  - access method, bit rate, X scale, Y scale, audio codec
    - access method {1:RTSP/TCP+RTP/UDP, 2:HTTP tunnelling}
    - bit rate {6k~512kbps}
    - X scale {128~352}
    - Y scale {96~288}
    - Video Codec {1:MPEG4}
    - audio codec {0:none, 1:CELP 8k, 2:CELP 16k, 3:AAC 16k, 4:AAC 32k, 5:AAC 44.1k, 6:AAC 48k}

FIG. 9

- ■ PROFILE DESCRIPTION
    - ■ PROFILE SPACE ID= 10000001
    - ■ access method {1:RTSP/TCP+RTP/UDP, 2:HTTP tunnelling}
    - ■ bit rate {6k~128kbps}
    - ■ X scale {160}
    - ■ Y scale {120}
    - ■ audio codec {0:none, 1:CELP 8k}

FIG. 10

- ■ PROFILE ATOM DESCRIPTION
    - ■ PROFILE SPACE ID= 10000001
    - ■ access method {2:HTTP tunnelling}
    - ■ bit rate {48kbps}
    - ■ X scale {160}
    - ■ Y scale {120}
    - ■ audio codec {1:CELP 8k}

FIG. 13

| PROFILE SPACE ID = 10000002 | | |
|---|---|---|
| PARAMETERS | OVERALL PARAMETERS | access method {1:RTSP/TCP+RTP/UDP, 2:HTTP tunnelling}<br>Link Speed {6k~10000kbps} |
| | Video PARAMETERS | X scale {128pixels ~ 352pixels}<br>Y scale {96pixels ~ 288pixels} |
| | Audio PARAMETERS | audio codec {0:none, 1:CELP 8k, 2:CELP16k, 3:AAC 16k, 4:AAC 32k, 5:AAC 44.1k, 6:AAC 48k} |

FIG. 15

| REGIONS | |
|---|---|
| (1) | 1\|2, 30:49, 10, 7, 0\|1 |
| (2) | 1\|2, 50:199, 10, 7, 1\|2 |
| (3) | 1\|2, 200:100000, 10, 7, 1\|2\|3\|4\|5\|6 |
| (4) | 1\|2, 200:100000, 20, 15, 1\|2\|3\|4\|5\|6 |

FIG. 19

| PROVIDER PROFILE | |
|---|---|
| REGION (1) | 1\|2, 30:49, 10, 7, 0\|1 |
| REGION (2) | 1\|2, 50:199, 10, 7, 1\|2 |
| REGION (3) | 1\|2, 200:4800, 10, 7, 1\|2\|3\|4\|5\|6 |

FIG. 20

| CONSUMER PROFILE | |
|---|---|
| REGION (1) | 1\|2, 30:48, 10, 7, 0\|1 |

PROGRAM, INFORMATION PROCESSING METHOD AND DEVICE, AND DATA STRUCTURE

TECHNICAL FIELD

The present invention relates to programs, information processing methods and apparatuses, and data structures, particularly to a program, an information processing method and apparatus, and a data structure with which a connection can be formed reliably between apparatuses having different capabilities.

BACKGROUND ART

Recently, the Internet has become popular, leading to an increase in the number of users who exchange various data with other users over the Internet.

However, for example, when a user wishes to send a certain image to an apparatus of another user, it has been the case that mutual connection is essentially prohibited due to difference between the capabilities of a device of a user and a device of another user, resulting in a failure in transmitting image data.

In order to prevent this situation, a user must check the capability of a device at the other end in advance.

For example, in the case of streaming, RTSP (Real Time Streaming Protocol) (Real Time Streaming Protocol, IETF RFC 2326, April 1998, <http://www.ietf.org/rfc/rfc/2326.txt>) defines use of SDP (Session Description Protocol) (SDP: Session Description Protocol, IETF RFC 2327, April 1998, <http://www.ietf.org/rfc/rfc/2327.txt>) as a method of exchanging parameters for streaming between a server and a client.

However, RTSP does not define a specific method of exchanging parameters, resulting in a failure to overcome the problem that data cannot be exchanged reliably between a server and a client.

DISCLOSURE OF INVENTION

The present invention has been made in view of the situation described above, and it aims at allowing reliable connection with an apparatus at the other end and exchange of data therewith.

A program according to the present invention allows a computer to execute a generating step of obtaining M-dimensional parameters relating to a service, the parameters being represented as numeric values, and generating detailed information representing content of the service by the parameters obtained.

The generating step may obtain the parameters normalized by base units.

The generating step may divide the parameters into a plurality of regions based on a main-factor parameter that is most likely to restrict coexistence with the other parameters, and obtain the parameters for each of the regions.

The generating step may obtain the M-dimensional parameters for each of the regions as one-dimensional integer values, respectively.

The generating step may represent the detailed information by a combination of the integer values and logic symbols.

The generating step may use a first symbol representing selection of one of the plurality of integer values and a second symbol representing a set of the integer values.

The generating step may use, as the second symbol, a start value representing a start of a range, an end value representing an end of the range, and a step defining a change width between the start value and the end value.

The service may be a service of sending or receiving data via a network.

The generating step may further obtain an identifier for identifying the service, and add the identifier to the detailed information.

May be a first sending step of sending the identifier to a specified destination via the network.

The program may further include a first receiving step of receiving a request for sending the detailed information associated with the identifier from the destination; a sending step of sending the detailed information to the destination via the network, based on the request received by the processing in the first receiving step; a second receiving step of receiving the M-dimensional parameters included in the detailed information sent from the destination; and a communicating step of communication with the destination based on the M-dimensional parameters received by the processing in the second receiving step.

The program may further include a first receiving step of receiving the identifier sent via the network.

The program may further include a requesting step of requesting sending of the identification information generated by a sender of the identifier received by the processing in the first receiving step, the identification information being the detailed information associated with the identifier; a second receiving step of receiving the detailed information sent via the network from the sender of the identifier, based on the request by the processing in the requesting step; a setting step of comparing the detailed information received by the processing in the second receiving step with the detailed information generated by the processing in the generating step, and setting the M-dimensional parameters that satisfy both of these sets of detailed information; a sending step of sending the M-dimensional parameters generated by the processing in the setting step to the sender of the identifier; and a communicating step of communicating with the sender based on the M-dimensional parameters sent by the processing in the sending step.

An information processing method according to the present invention includes a generating step of obtaining M-dimensional parameters relating to a service, the parameters being represented as numeric values, and generating detailed information representing content of the service by the parameters obtained.

An information processing apparatus according to the present invention includes generating means of obtaining M-dimensional parameters relating to a service, the parameters being represented as numeric values, and generating detailed information representing content of the service by the parameters obtained.

A data structure according to the present invention includes M-dimensional parameters, and the parameters are represented by combinations of integer values and logic symbols.

The logic symbols may include a first symbol representing selection of one of a plurality of integer values and a second symbol representing a set of integer values.

The second symbol may include a start value representing a start of a range, an end value representing an end of the range, and a step defining a change width between the start value and the end value.

The data structure may further include an identifier number for identifying the service.

According to the program and information processing method and apparatus of the present invention, M-dimensional parameters relating to a service, represented as numeric values, are obtained, and detailed information representing content of the service by the parameters is generated.

According to the data structure of the present invention, the data structure includes M-dimensional parameters, and the parameters are represented by combinations of integer values and logic symbols.

BRIEF DESCRIPTION OF THE DRAWINGS

FIG. 8 is a diagram showing an example of a profile space.

FIG. 9 is a diagram showing an example of a profile description.

FIG. 10 is a diagram showing an example of a profile atom.

FIG. 13 is a diagram showing the constitution of a profile.

FIG. 15 is a diagram showing regions of a profile.

FIG. 19 is a diagram showing an example of a provider profile.

FIG. 20 is a diagram showing an example of a consumer profile.

BEST MODE FOR CARRYING OUT THE INVENTION

Figure 1:
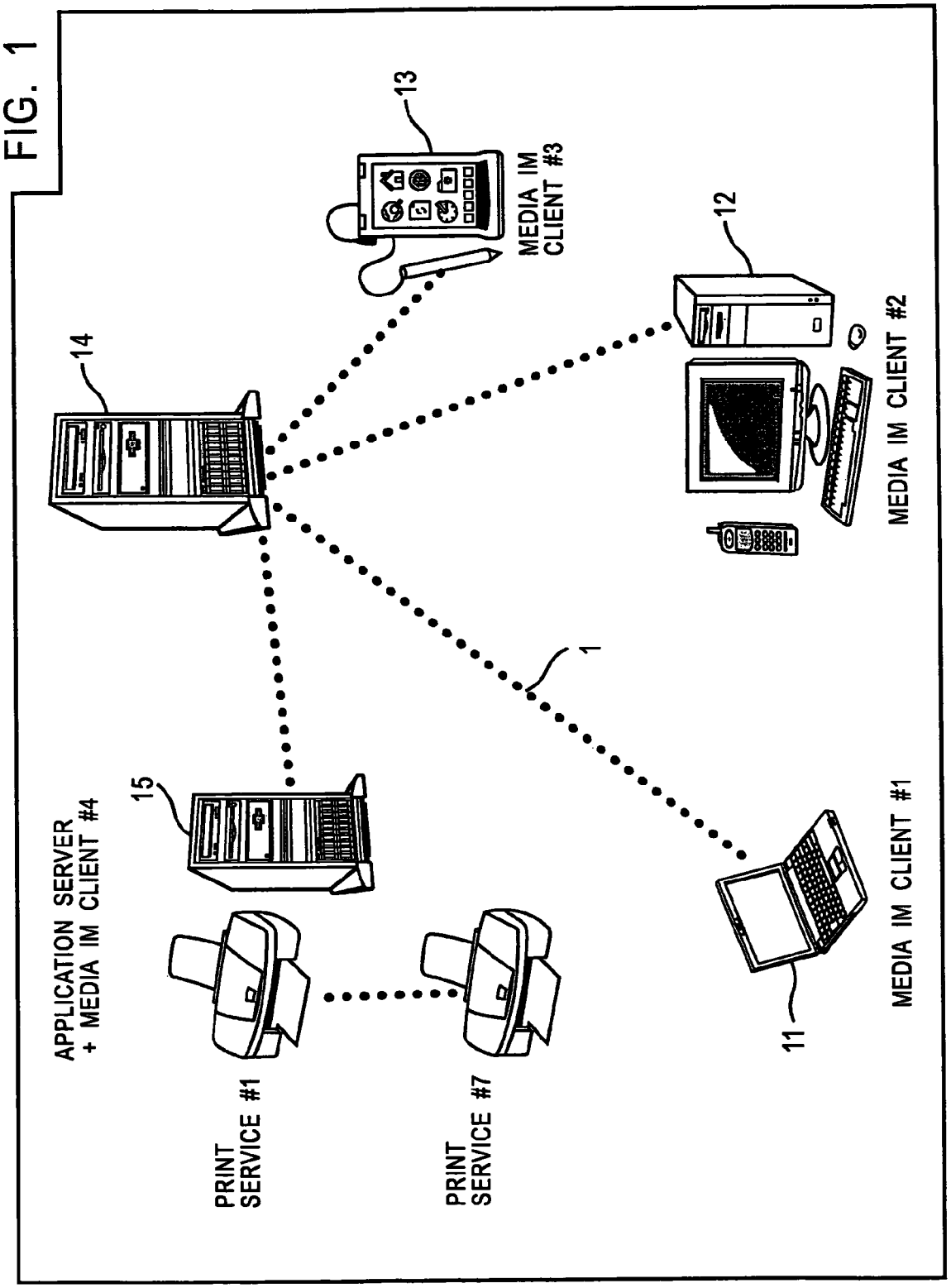
FIG. 1 is a diagram showing an example configuration of a network system according to the present invention.

FIG. 1 shows an example configuration of a network system according to the present invention. In the network system, as user terminals, personal computers 11 and 12 and PDA (Personal Digital Assistants) 13 are connected to a media instant message server (Media IM Server) 14. Also, an application server 15 is connected to the media IM server 14 via the Internet 1.

In the personal computer 11, a media IM client #1 is implemented as middleware. In the personal computer 12, a media IM client #2 is implemented as middleware. Similarly, in the PDA 13, a media IM client #3 is implemented as middleware.

In the application server 15, a media IM client #4 is implemented as middleware. The application server 15 provides print services #1 to #7 to users accessing the application server 15.

The media IM server 14 controls instant message processing among these media IM clients #1 to #4.

Figure 2:
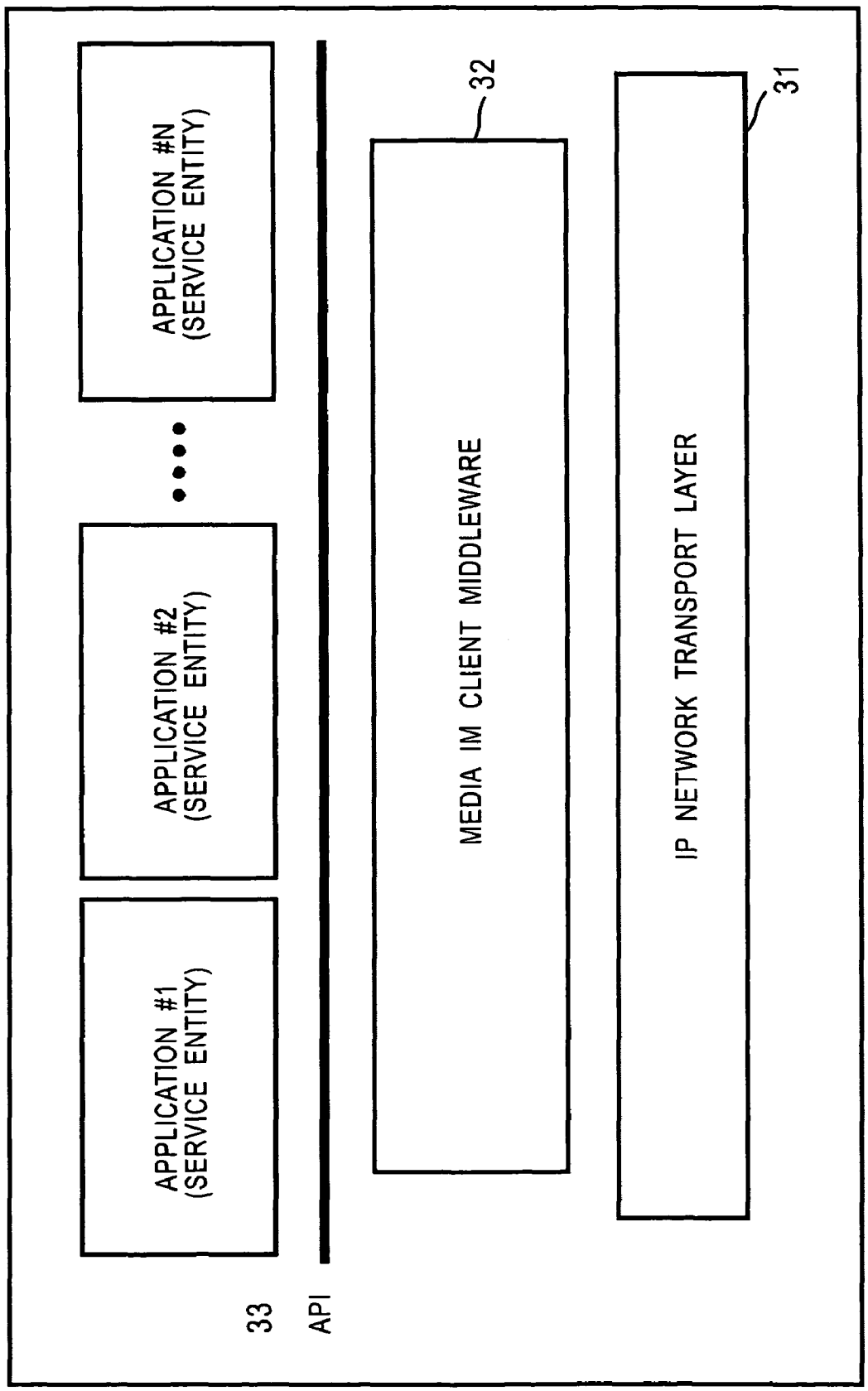
FIG. 2 is a diagram showing a software hierarchy.

FIG. 2 shows the software configuration. In FIG. 2, the media IM clients #1 to #4 described above are shown as media IM client middleware 32. The media IM client middleware 32 is provided between an IP network transport layer 31 and an API (Application Program Interface) 33. The API 33 executes interface processing between applications #1 to #N and the media IM client middleware 32. The media IM client middleware 32 executes interface processing between the API 33 and the IP network transport layer 31.

The applications #1 to #N respectively constitute service entities.

Figure 3:
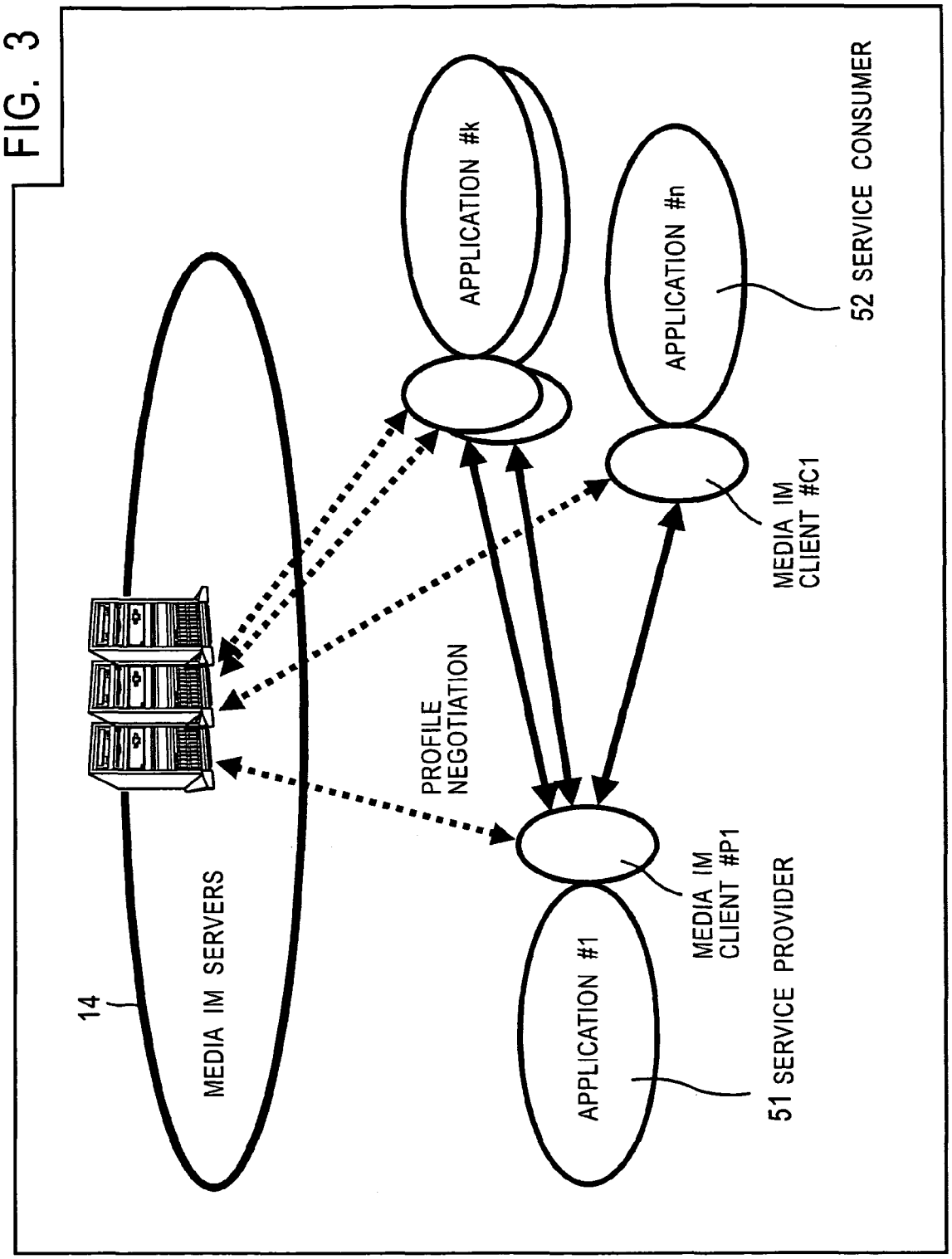
FIG. 3 is a diagram showing the overall operation of the network system according to the present invention.
Figure 4:
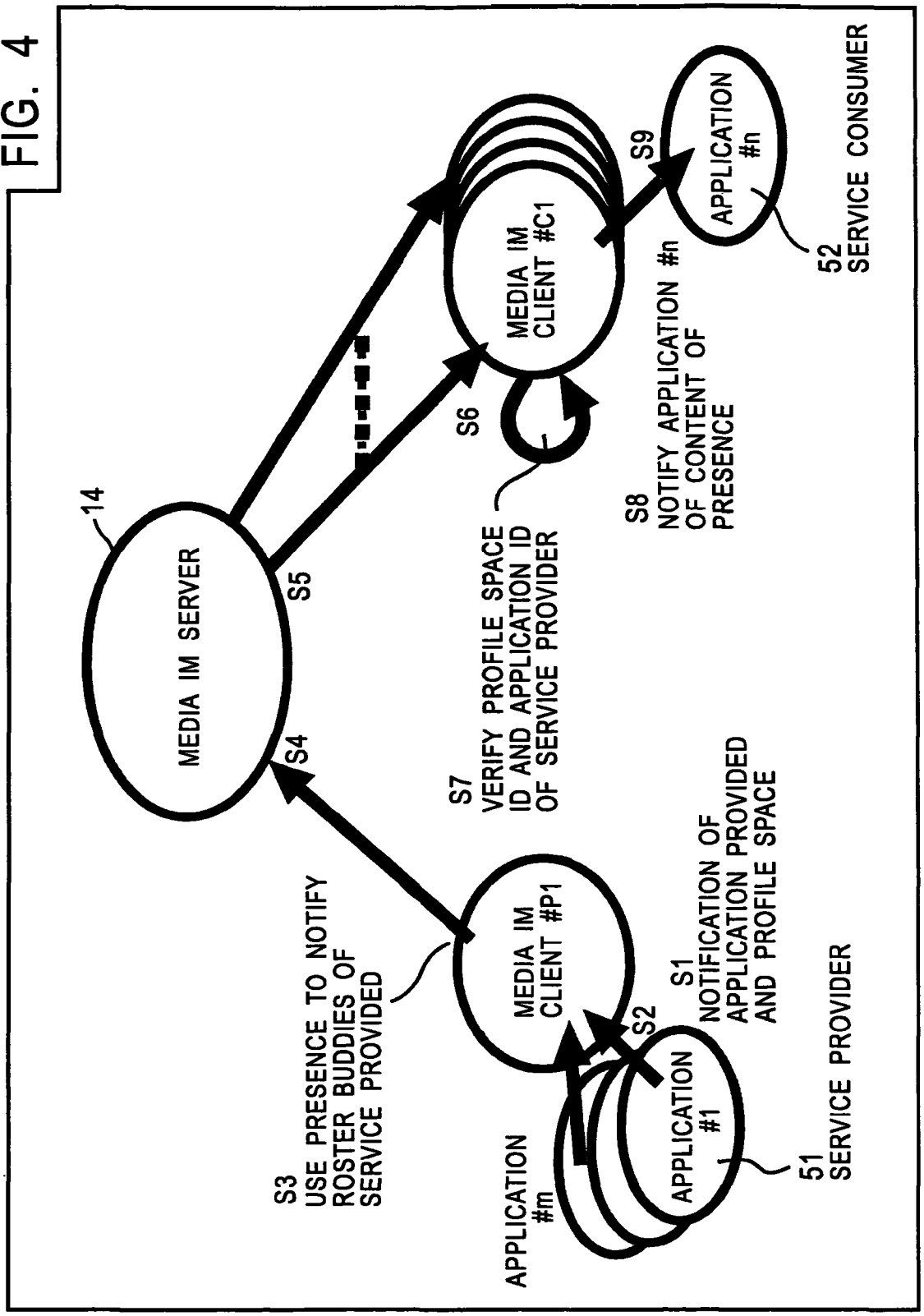
FIG. 4 is a flowchart showing an operation of the network system shown in FIG. 1.
Figure 5:
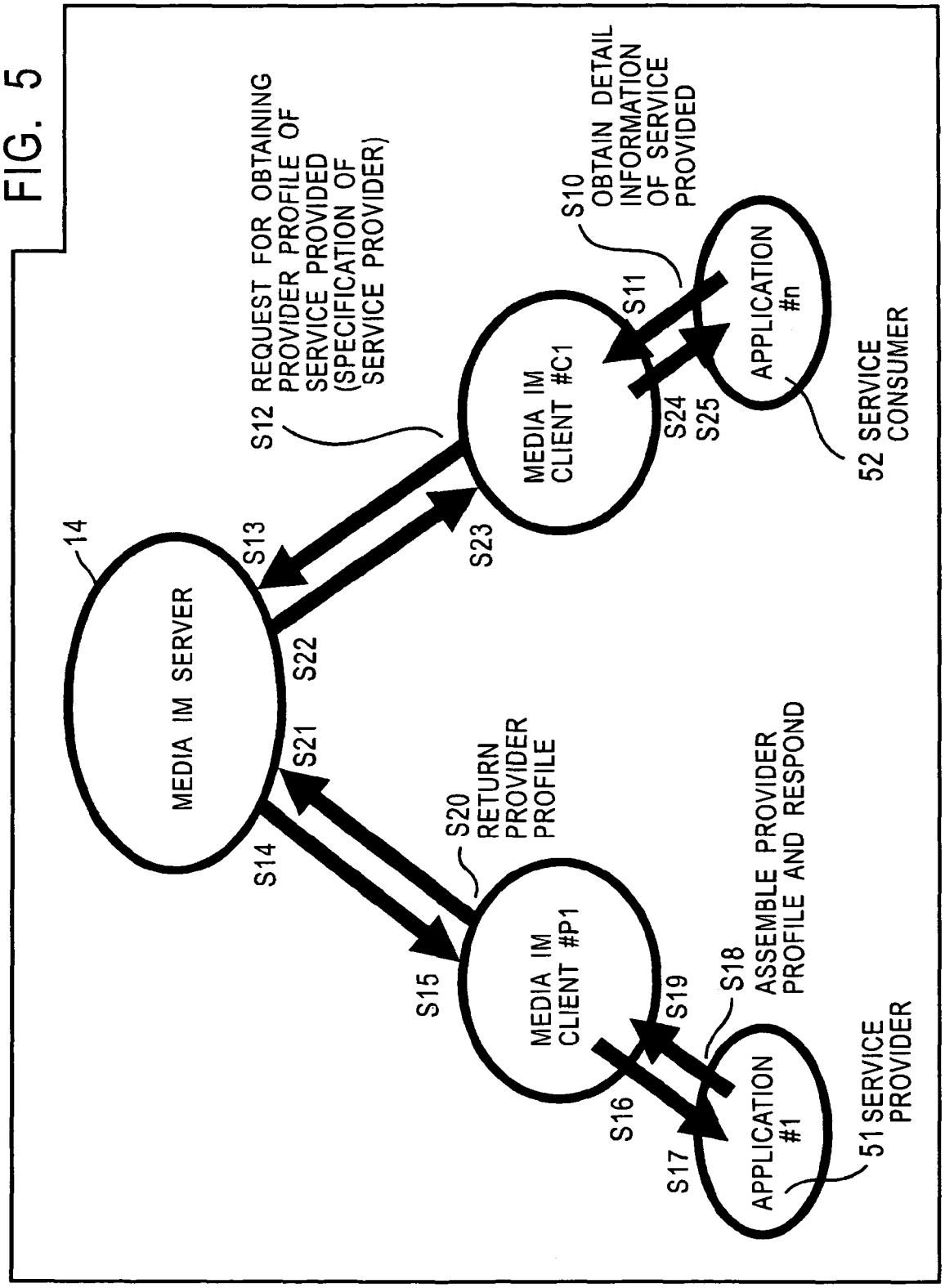
FIG. 5 is a flowchart showing an operation of the network system shown in FIG. 1.

In the network system, as shown in FIG. 3, an application that provides a service (the application #1 in the example shown in FIG. 3) acts as a service provider 51, and an application that receives the service (i.e., that consumes the service) (the application #n in the example shown in FIG. 3) acts as a service consumer 52.

The service provider 51 and the service consumer 52 execute a negotiation process for connection via media IM clients #P1 and #C1 respectively associated therewith, using a presence function, messaging function, or Info/Query function of instant messaging. After confirming by the negotiation that mutual connection is possible, the service provider 51 and the service consumer 52 execute a connection process by peer to peer (P2P).

The service provider 51 and the service consumer 52 respectively constitute service entities. A single application may consist entirely of a service entity in some cases, or consist of a set of service entities. Hereinafter, for simplicity, it will be assumed that a single service entity corresponds to a single application.

Next, the connection process will be described in detail with reference to flowcharts shown in FIGS. 4 to 7.

In step S1, the application #1 acting as the service provider 51 instructs the media IM client #P1 to announce a profile space ID representing types of services that it can provide to buddies registered in a roster. Upon receiving the instruction in step S2, the media IM client #P1, in step S3, notifies the buddies that have been registered in the roster of the profile space ID by presence.

A buddy refers to a party involved in message communication with a user (or a media IM client) in an instant messaging service provided by the media IM server 14. A buddy is information represented by a user ID, a nickname associated with a user ID, or the like, registered in advance in the media IM server 14.

A roster refers to a list of buddies, i.e., a list of user IDs (or nicknames) of other users (or other media IM clients) specified by a user (or a media IM client) as parties involved in message communication. Rosters for respective users are unitarily managed by the media IM server 14.

For example, if a user of the media IM client #P1 has specified a user of the media IM client #C1 as a party involved in message communication, the user (a user ID or the like) of the user of the media IM client #C1 is registered as a buddy in a roster associated with the media IM client #P1. Conversely, if the user of the media IM client #C1 has specified the user of the media IM client #P1 as a party involved in message communication, the user of the media IM client #P1 is registered as a buddy in a roster associated with the media IM client #C1.

As described above, in order to execute message communication by instant messaging, parties involved must be mutually registered in advance in rosters as buddies. For example, if a first user of a media IM client has registered a second user of another media IM client as a buddy in a roster and if the second user has not registered the first user as a buddy in the client of the second user, in order to execute message communication, the first user must be registered by the second user as a buddy in a roster prior to message communication.

When a user has logged in (connected) to the media IM server 14 using a media IM client, the roster is provided as required from the media IM server 14 to the media IM client, and is displayed in the form of a GUI (Graphical User Interface) on a display or the like. At that time, the media IM server 14 supplies to the media IM client icons that allow the user to readily recognize intended buddies, and information relating to the buddies (e.g., information representing whether or not communication is possible), such as presence, as well as the roster described above. The media client, upon receiving the roster and related information, displays the buddies in the roster in association with the icons and presence.

It is to be understood that the rosters described above may be managed by a server provided particularly for unitarily managing the rosters.

Profile space IDs and application IDs are registered in advance and managed by an administrator of an application platform that allows negotiation of profiles at an application level based on a presence function, messaging function, and Info/Query function of instant messaging, such as the network system shown in FIG. 1. Thus, the service consumer 52 is allowed to identify contents based on the IDs.

FIG. 8 shows an example of a profile space for defining an MPEG-4 streaming server application that runs on the personal computer 11. As shown in the figure, the profile space is an M dimensional space that represent services provided by the personal computer, and is constituted by a profile space ID that serves as an ID for identifying each profile space and M dimensional parameters. In this example, the profile space ID is "10000001", and the parameters include "access method", "bit rate (link speed)", "X scale", "Y scale", and "audio codec". In this example, the value of the access method, representing a protocol used for communication, is 1 (RTSP/TCP+RTP/UDP) or 2 (HTTP tunnelling). The value of the bit rate, representing a rate of a communication line that is connected, is 6 k to 512 kbps. The value of the X scale, representing a screen size in a horizontal direction, is 128 pixels to 352 pixels. The value of the Y scale, representing a screen size in a vertical direction, is 96 pixels to 288 pixels.

The access method in the profile represents a protocol used for communication, for example, either RTSP (Real Time Streaming Protocol)/TCP (Transmission Control Protocol)+RTP (Real Time Transport Protocol)/UDP (User Datagram Protocol) represented by number 1 or HTTP (Hyper Text Transfer Protocol) tunnelling represented by number 2. The bit rate represents a data transfer rate of a communication line that is used. That is, the bit rate serves as information for determining an MPEG-4 data transfer rate of an MPEG-4 streaming service provided by the application #1.

The video codec representing a method of video compression and expansion is MPEG-4. The audio codec representing a method of audio compression and expansion is one of none, CELP (Code Excited Linear Predictive) 8 k, CELP 16 k, AAC (Advanced Audio Coding) 16 k, AAC 32 k, AAC 44.1 k, and AAC 48 k.

As described above, all the parameters are represented by numeric values. Thus, the availability of a service can be determined quickly and readily between a service provider that provides the service and a service consumer that receives the service (i.e., that uses the service).

Referring back to FIG. 4, upon receiving the notification from the media IM client #P1 in step S4, the media IM server 14, in step S5, announces the notification to each buddy in the roster.

The media IM client #C1, which is one of the buddies (the service consumer 52) that receive the announcement, upon receiving the notification in step S6, determines (verifies) in step S7 whether the profile is acceptable for the media IM client #C1 based on the profile space ID and the application ID of the service provider 51 (the ID of the application #1 in this example). This is possible since, as described earlier, each participant in the system is allowed to identify content of the profile (functions of a device of another party involved, as shown in FIG. 8) based on these IDs.

For example, each of the media IM clients (i.e., the personal computers 11 and 12, and the like) stores in advance a table in which application IDs and profile IDs are associated with type of parameters included in profiles and sets of values that the parameters are allowed to take on, and information regarding applications that act as service consumers, as shown in FIG. 8. In step S7, the media IM client refers to the table that it holds, identifies types of parameters included in a profile associated with the application ID and the profile ID obtained in step S6 and a set of values that the parameters are allowed to take on, and determines, based on the information that it holds regarding the application, whether the parameters identified (the profile associated with the parameters) are compatible with the functions of the application that acts as a service consumer (i.e., whether the parameters are acceptable).

The table defining association between IDs and contents may be stored in each device (the personal computers 11 and 12, and the like), or in a predetermined server (e.g., the media IM server 14). In that case, a user may be billed each time the user uses the table for verification. This allows an administrator of the media IM server 14 to earn profit.

If the media IM client #C1 determines that the content of the profile for which presence has been received from the service provider 51 is acceptable for the service consumer, in step S8, the media IM client #C1 notifies the content of the profile (a profile associated with the profile space ID, shown in FIG. 8) of the application #n that acts as the service consumer 52 capable of accepting the profile. In step S9, the application #n receives the notification from the media IM client #C1.

Each of the media IM clients, having received the announcement from the service provider (steps S4 to S6), ignores the announcement if it is determined by the verification in step S7 that an application that suitably acts as a service consumer does not exist.

Upon receiving the content of the presence from the service provider 51, the application #n acting as the service consumer 52, in step S10, instructs the media IM client #C1 to obtain detailed information of the service provided by the service provider 51. Upon receiving the instruction in step S11, the media IM client #C1, in step S12, using the messaging function or Info/Query function, requests transmission of a provider profile including a part of or all the parameters of the parameter set of the profile space of the service provided by the service provider 51, described earlier. The request includes destination information for specifying the service provider 51.

When a notification or request is issued using the Info/Query function, as opposed to a case where the messaging function is used, a response for acknowledgement of reception is supplied from the recipient to the sender. For example, when the application #1 of the media IM client #P1 obtains a roster from the media IM server 14, the media IM client #P1 uses the Info/Query function to supply a GET command or the like to the media IM server 14. Upon receiving the GET command, the media IM server 14 supplies a response acknowledging reception to the application #1 via the media IM client #P1 at the source of the command. By the response, the application #1 is allowed to confirm that the GET command has been supplied to the media IM server 14.

Since an acknowledge response is supplied from a destination to a source at the application level as described above, an application is allowed to send a notification or request reliably to a destination by using the Info/Query function.

On the other hand, when a notification or request is issued using the messaging function, an application at a destination that has received the notification or request does not supply the acknowledgement response described above to a source. Thus, an application at the source is not allowed to grasp whether the notification or request issued using the messaging function has been received by the destination. Therefore, compared with the case where the Info/Query function is used, the reliability of transmission to an intended destination becomes lower. However, when a notification or request is issued using the messaging function, communication process becomes simpler compared with the case where the Info/Query function is used, so that processing load becomes smaller. The messaging function is used, for example, for exchanging an instant message (IMSTANT MESSAGING) of a text document between media IM clients.

The notification or request by the Info/Query function, and the notification or request by the messaging function, described above, can be used by media IM servers as well as media IM clients, and can be used, for example, as a notification or request between media IM clients as well as a notification or request between a media IM client and a media IM server.

Furthermore, notifications or requests by the Info/Query function or the messaging function may include any data regardless of content, such as messages and parameters, as well as commands.

As described above, the media IM client #P1, the media IM client #C1, and the media IM server 14 exchange data (including notifications, requests, and the like) using the messaging function or the Info/Query function.

As described above, the media IM client #P1 or the like may send a provider profile using either the messaging function or the Info/Query function. It is to be noted that when a provider profile is sent using the Info/Query function, a response to the transmission of the provider file is supplied from the destination to the source of the transmission.

Upon receiving the request from the media IM client #C1 in step S13, the media IM server 14, in step S14, sends the request to the media IM client #P1. Upon receiving the request from the media IM server 14 in step S15, the media IM client #P1, in step S16, supplies the request to the application #1 acting as the service provider 51.

Upon receiving the request from the media IM client #P1 in step S17, the application #1, in step S18, assembles a provider profile that is to be provided to the service consumer 52, and sends the provider profile to the media IM client #P1. The assembly of the provider profile will be described later in detail with reference to flowcharts shown in FIGS. 16 and 17.

The content of the provider file generated by the application #1 specifically sets ranges of values of parameters that the service provider 51 can actually provide to the service consumer 52 with consideration of runtime environments such as network link speed and CPU load status.

FIG. 9 shows an example of a provider profile generated as described above. In FIG. 9, the provider profile is represented as a profile description.

FIG. 9 shows an example where the application #1 acting as the service provider 51 only supports a viewing angle corresponding to VGA (Video Graphics Array) (160 pixels× 120 pixels or 320 pixels×240 pixels), and is connected to a network equivalent to a PHS (Personal Handyphone System) (a network with a maximum link speed of 128 kbps). Thus, in the example shown in FIG. 9, with consideration of the network link speed, the viewing angle is limited only to 160 pixels×120 pixels (X scale×Y scale) of the range defined by the profile space shown in FIG. 8.

In the example shown in FIG. 9, the profile space ID is "10000001", indicating that the profile description corresponds to the profile space shown in FIG. 8. That is, as described earlier, when the media IM client #C1 requests a provider profile in step S12, in response to the request, a profile description (provider profile) corresponding to the profile space ID supplied by the media IM client #P1 in step S3 is generated, as shown in FIG. 9.

The access method in FIG. 9 is either RTSP/TCP+RTP/UDP or HTTP tunnelling. The bit rate is 6 kpbs to 128 kbps. The audio codec is none or CELP 8 k.

Upon receiving a response for the provider profile from the application #1 in step S19, the media IM client #P1, in step S20, returns the response to the application #n using the messaging function or the Info/Query function.

Upon receiving the reply from the media IM client #P1 in step S21, the media IM server 14, in step S22, sends the reply to the media IM client #C1. Upon receiving the reply in step S23, the media IM client #C1, in step S24, sends the reply to the application #n. In step S25, the application #n receives the reply from the service provider 51 (including the provider profile shown in FIG. 9).

The application #n checks matching (performs a comparison) between the provider profile of the service provider 51, received by the processing in step S25, and a consumer profile that the application #n itself generates. The provider profile and the consumer profile described above are generated by a process described later with reference to flowcharts shown in FIGS. 16 and 17.

As described earlier, the provider profile is a profile created by the application #1 based on the profile space of the content determined by the media IM client #C1 as acceptable by the service consumer. That is, the profile space corresponding to the provider profile is also supported by the application #n acting as the service consumer. Thus, the application #n is allowed to execute the same process as in the case where the application #1 creates a provider profile, thereby creating a profile including a part of or all the parameters in a parameter set of the profile space supported by the service consumer (i.e., a consumer profile). The application #n checks matching between the received provider profile of the service provider 51 and the consumer profile created as described above.

As described earlier, the provider profile (profile description) presented by the service provider is represented by numeric values only. Thus, the service provider 51 is allowed to readily verify matching simply by a one-dimensional comparison with ranges of values of parameters included in its own profile.

A dimension herein refers to the effective number of parameters. That is, the service consumer 52 compares, one by one, the range of values of each parameter of the consumer profile with the range of values of the corresponding parameter of the provider profile.

If a part of or all of the ranges of values of the parameters of the consumer profile overlap the ranges of values of the corresponding parameters of the provider profile, that is, if it is determined that a range exists in which the service consumer 52 is capable of receiving the service provided by the service provider 51 (the application #n is capable of accepting data sent by the application #1), the service consumer 52 determines that matching is confirmed.

If matching is confirmed, the application #n, in step S26, requests the service provider 51 to register itself (i.e., the service consumer 52) to the service provided. Upon receiving the request from the application #n in step S27, the media IM client #C1, in step S28, requests the service provider 51 for registration to the service, using the messaging function or the Info/Query function, i.e., requests registration of the service consumer 52 as a receiver of the service through registration of the application ID of the application #n of the service consumer 52. At this time, the profile space ID and the application ID (ID of the application #n) are included in the request.

Upon receiving the request from the media IM client #C1 in step S29, the media IM server 14, in step S30, sends the request to the media IM client #P1. Upon receiving the request from the media IM server 14 in step S31, the media IM client #P1, in step S32, sends the request to the application #1. In step S33, the application #1 receives the registration request from the service consumer 52.

The application #1 acting as the service provider 51 registers the service consumer 52 in association with the service provided to the service consumer 52 by the processing in step S18. More specifically, the application ID of the application #n of the service consumer 52 is registered in association with the profile space ID.

The information regarding the service consumer 52, registered as described above, is used when the application #1 provides a service. That is, the application #1 refers to the registered information, and provides a service to an application of the service consumer 52 (an application corresponding to the application ID) based on the information.

In step S34, the application #1 instructs the media IM client #P1 to issue a response to the request for registration to the service, supplied from the service consumer 52 (i.e., information indicating whether registration of the application #n has been completed), the request being a request for registering the application ID of the application #n of the service consumer 52 in association with the profile space ID to thereby register the service consumer 52 as a receiver of the service. Upon receiving the instruction in step S35, the media IM client #P1, in step S36, issues a notification of a registration result that serves as a response to the request supplied thereto, using the messaging function or the Info/Query function. Upon receiving the notification of the registration result in step S37, the media IM server 14, in step S38, sends the notification to the media IM client #C1. Upon receiving the notification in step S39, the media IM client #C1, in step S40, sends the notification to the application #n. In step S41, the application #n receives the notification of the registration result.

In step S42, the application #n determines, as a profile atom, parameters for assuring connectivity based on the profile description from the service provider 51 (i.e., the provider profile received by the processing in step S25). That is, parameters that allow the application #n to use data sent by the application #1 as it is (parameters acceptable by the application #n) are determined. The process of determining a profile atom will be described later in detail with reference to flowcharts shown in FIGS. 21 and 22.

FIG. 10 shows an example of the description of the profile atom. In this example, the profile space ID is "10000001", indicating that the profile atom corresponds to the profile space shown in FIG. 8. That is, as described earlier, upon receiving a profile description (provider profile) corresponding to the profile space ID, created and supplied by the media IM client #P1 in response to a request from the media IM client #C1, the media IM client #C1 creates a consumer profile corresponding to the profile space ID, and compares the consumer profile with the provider profile supplied thereto. If these profiles are determined as matching, the media IM client #C1 executes registration to the service provided, identifies ranges of parameters for assuring connectivity from the ranges of the respective parameters included in the profile space corresponding to the profiles, thereby generating a profile atom including parameters in those ranges, as shown in FIG. 10.

The access method is HTTP tunnelling. That is, as the access method in the provider profile shown in FIG. 9, access method associated with number 2 is selected.

The bit rate is 48 kbps, the X scale is 160, and the Y scale is 120. The audio codec is CELP 8 k.

In step S42, the application #n issues a connect request to which the profile atom determined as described above is attached. Upon receiving the request in step S43, the media IM client #C1, in step S44, sends the request to the service provider 51 using the messaging function or the Info/Query function. Upon receiving the request in step S45, the media IM server 14, in step S46, sends the request to the media IM client #P1. Upon receiving the request from the media IM server 14 in step S47, the media IM client #P1, in step S48, sends the request to the application #1. In step S49, the application #1 receives the request.

Upon receiving the request, the application #1, in step S50, sends to the service consumer 52 a response including connection information needed by the service consumer 52 (i.e., the application #n) to connect to the service provider 51 (i.e., the application #1). The connection information may be, for example, a URI (Uniform Resource Identifier) representing an address of the service provider 51 that is accessed when the service consumer 52 connects to the service provider 51 (service URI).

The response sent by the processing in step S50 by the application #1 is received by the media IM client #P1 in step S51. In step S52, the media IM client #P1 sends the response to the service consumer 52 using the messaging function or the Info/Query function. Upon receiving the response from the media IM client #P1 in step S53, the media IM server 14, in step S54, sends the response to the media IM client #C1. Upon receiving the response from the media IM server 14 in step S55, the media IM client #C1, in step S56, sends the response to the application #n. In step S57, the application #n receives the response.

After instructing sending of a response in step S50, the application #1 waits for a direct access (not via the media IM server 14) from the application #n. Thus, in step S58, the application #n accesses the service URL (Uniform Resource Locator) of the application #1 by peer to peer, not via the media IM server 14. In step S59, the application #1 accepts the peer-to-peer access to the URL by the application #n.

Thereafter, the application #1 and the application #n are allowed to exchange information by peer to peer.

As a final result of the procedure described above, the application #1 and the application #n exchange executable functions in advance, so that connectivity between the application #1 and the application #n is assured, serving to prevent failure to exchange information.

As described above, according to the application platform of the present invention, new protocol architecture for allowing negotiation of profiles at the application level is implemented based on the presence function, messaging function, and Info/Query function of instant messaging. Thus, by using a match making function in the application platform, applications mounted on various devices having different capabilities (obviously, the capabilities may be the same), such as personal computers and mobile devices, are allowed to connect to each other readily and reliably. Accordingly, a system that allows rich media information including various information such as text, audio, music, moving pictures, and still pictures to be transmitted by peer-to-peer communication can be implemented. In that case, applications (service entities) for which connectivity is finally assured are allowed to communicate with each other by peer to peer. Accordingly, a user is allowed to exchange information readily and reliably without performing special operations.

The applications (service entities) described above may be applied to commercial application servers on the Internet 1 as well as personal computers and network-enabled CE (Consumer Electronics) devices.

For example, in the application server 15 shown in FIG. 1, an application for a commercial print service is run as a service provider on the media IM client #4. Thus, the personal computers 11 and 12 and the PDA 13 shown in FIG. 1 are allowed to use, via the Internet 1, the print service provided by the application server 15, by executing the procedure described above with the application server 15.

Figure 11:
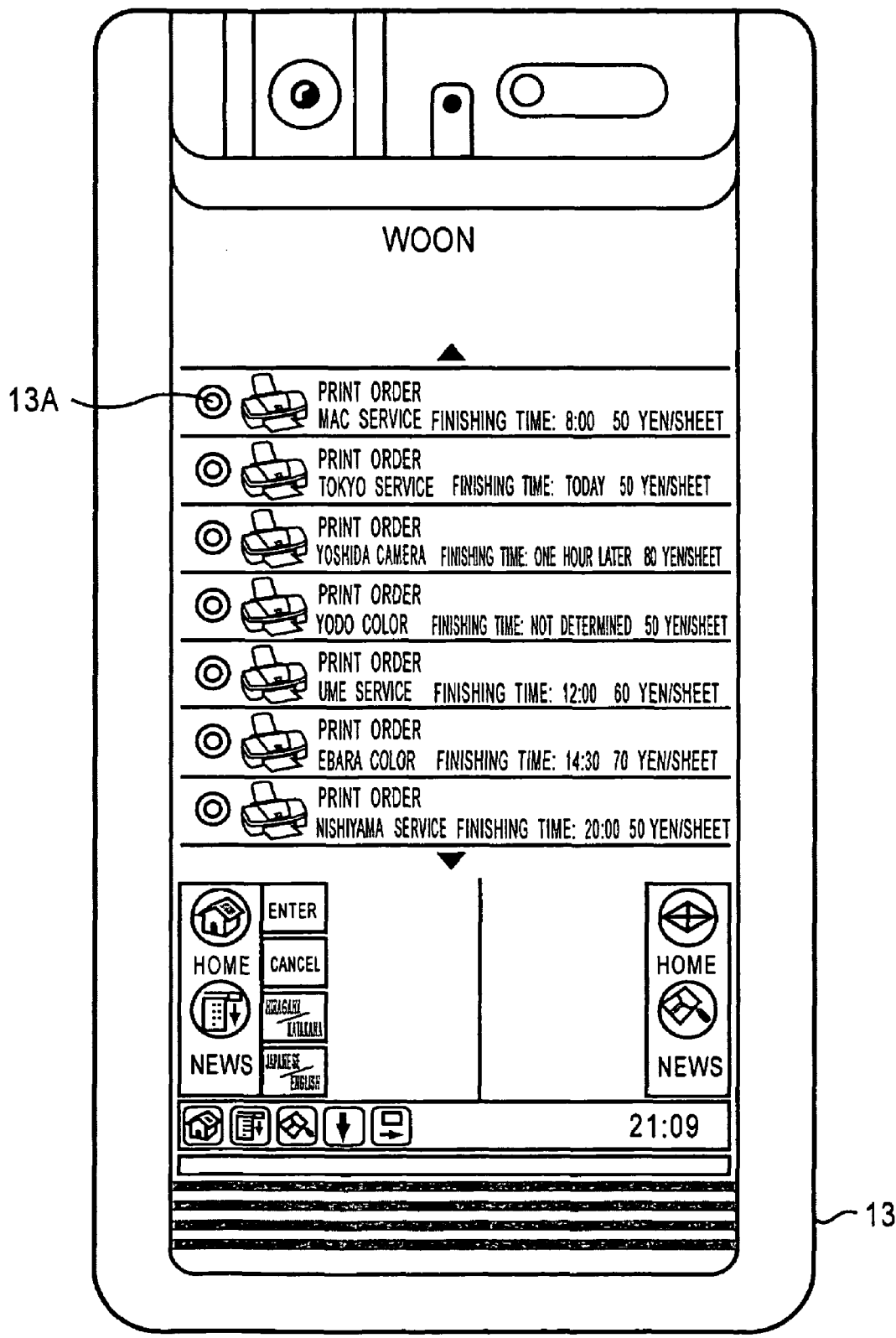
FIG. 11 is a diagram showing an example screen showing a list of service providers.

Thus, according to the present invention, by searching for services provided by servers connected to the Internet 1, a list of service providers can be displayed as a buddy list, for example, as shown in FIG. 11.

In the example shown in FIG. 11, a list of service providers that can be used by a print service application acting as a service consumer on the media IM client #3 implemented on the PDA 13 is shown. In this case, by using the presence function, status of commercial services can be expressed in detail and flexibly in relation to service consumers. For example, in the example shown in FIG. 11, whether or not a commercial service is in operation is indicated by a lamp icon 13A. In this case, for example, a commercial service in operation is indicated by green, and a commercial service not in operation is indicated by red. Furthermore, in the example shown in FIG. 11, detailed status, such as when a requested print will be finished, and a price, is displayed as status information.

Obviously, between applications of service providers and service consumers on user terminals, status can be displayed on an application basis depending on the other party involved, using a user interface and the presence function.

Figure 12:
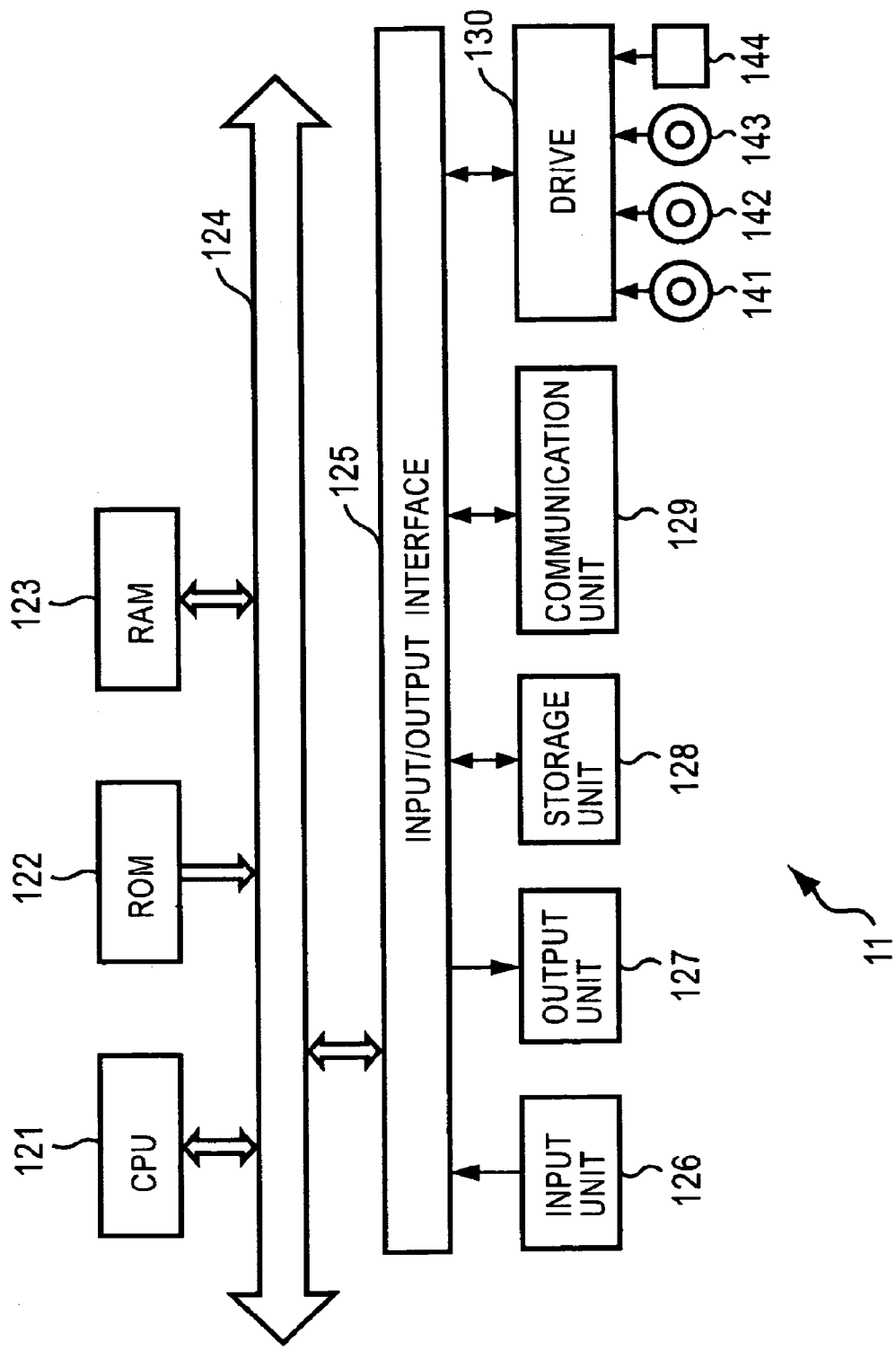
FIG. 12 is a block diagram showing an example configuration of a personal computer.

FIG. 12 shows an example configuration of the personal computer 11. Although not shown, another personal computer 12 is similarly configured. Thus, FIG. 12 is also referred to, when appropriate, as the configuration of the personal computer 12.

Referring to FIG. 12, a CPU (Central Processing Unit) 121 executes various processes according to programs stored in a ROM (Read Only Memory) 122 or programs loaded into a RAM (Random Access Memory) 123 from a storage unit 128. The RAM 123 also stores, as required, data needed by the CPU 121 for executing various processes.

The CPU 121, the ROM 122, and the RAM 123 are connected to each other via a bus 124. The bus 124 is also connected to an input/output interface 125.

The input/output interface 125 is connected to an input unit 126 including a keyboard and a mouse, an output unit including a display implemented by a CRT (Cathode Ray Tube) or an LCD (Liquid Crystal Display) and a speaker, a storage unit 128 implemented by a hard disk or the like, and a communication unit 129 implemented by a modem, a terminal adaptor, or the like. The communication unit 129 executes communication processes via a network including the Internet.

Furthermore, the input/output interface 125 is connected to a drive 130 as required. A magnetic disk 141, an optical disk 142, a magneto-optical disk 143, a semiconductor memory 144, or the like, is mounted as required, and a computer program read therefrom in installed on the storage unit 128 as required.

The application #1 (the service provider 51) and the media IM client #P1, or the application #n (the service consumer 52) and the media IM client #C1, described earlier, are loaded by the CPU 121 to the RAM 123 and are then executed.

According to the present invention, as described above, a profile describing content of a service is provided to a service consumer. The profile (profile description) is expressed by M-dimensional parameters. A dimension herein refers to the effective number of parameters. In the example shown in FIG. 13, the profile is composed of five-dimensional parameters (i.e., M=5).

FIG. 13 shows a profile space of an MPEG (Moving Picture Experts Group)-4 streaming server, which differs from the profile space in the example shown in FIG. 8. In the example shown in FIG. 13, parameters mainly include three types of parameters, namely, overall parameters, video parameters, and audio parameters. Of these parameters, the overall parameters include access method and Link Speed, and video parameters include X scale and Y scale. That is, the parameters are five-dimensional parameters including access method, Link Speed, X scale, Y scale, and audio codec. The five dimensional parameters are identified by a profile space ID of "10000002".

The access method in the profile represents a protocol that is used for communication, and is either RTSP (Real Time Streaming Protocol)/TCP (Transmission Control Protocol)+RTP (Real Time Transport Protocol)/UDP (User Datagram Protocol) represented by number 1 or HTTP (Hyper Text Transfer Protocol) tunnelling represented by number 2.

The Link Speed, representing a data transfer rate of a communication line that is used, corresponds to the bit rate in the example shown in FIG. 8, and is a value within a range of 6 kpbs to 100,000 kbps.

The X scale, representing a screen size along the direction of the X axis, is within a range of 128 pixels to 352 pixels, and the Y scale, representing a screen size along the direction of the Y axis, is within a range of 96 pixels to 288 pixels.

The audio codec, representing a method of audio compression and expansion, is one of none represented by number 0, CELP 8 k represented by number 1, CELP (Code Excited Linear Predictive) 16 k represented by number 2, AAC (Advanced Audio Coding) 16 k represented by number 3, AAC 32 k represented by number 2, AAC 44.1 k represented by number 5, and AAC 48 k represented by number 6.

As described above, all the parameters are represented by integer values. Furthermore, if a parameter constituting one dimension is represented as a combination of a plurality of integer values, the following logic symbols are used.

If a parameter is represented as one of a plurality of integer values, a logic symbol "OR" is used. "OR" is represented using a delimiter [|], such as [k] |[m] |[n]. This means that the parameter is one of k, m, and n. In this case, k, m, and n are integers, and are ordered from smaller to larger (i.e., k<m<n).

For example, as will be described later with reference to FIG. 15, the access method is "1|2", which indicates that the access method is either 1 (RTSP/TCP+RTP/UDP) or 2 (HTTP tunnelling).

When a parameter is represented by an integer value within a predetermined range, a logic symbol ":"representing the range is used. A range is represented, for example, as [m]:[n] #[k]. [m] represents a start value and [n] represents an end value. [m] and [n] cannot be omitted. Furthermore, obviously, the start value [m] is less than or equal to the end value [n]. #[k] represents a step defining a change width between the start value [m] and the end value [n], and is a natural number and a multiple of 1 as a base unit of normalization. [k] may be omitted.

For example, if the video X axis is represented as "8:22#2", it is meant that the video X axis is one of (8, 10, 12, 14, 16, 18, 20, 22). That is, assuming that the base unit of normalization is 16 pixels, (assuming that 16 pixels corresponds to k=1), the representation represents a set of values sampled at an interval of 32 pixels (corresponding to k=2) from 128 pixels to 352 pixels.

A description including a combination of a range and "OR" is prohibited, since otherwise it becomes impossible to readily determine whether a service can be received. A not-applicable (N/A) parameter is represented by null (,.).

Figure 14:
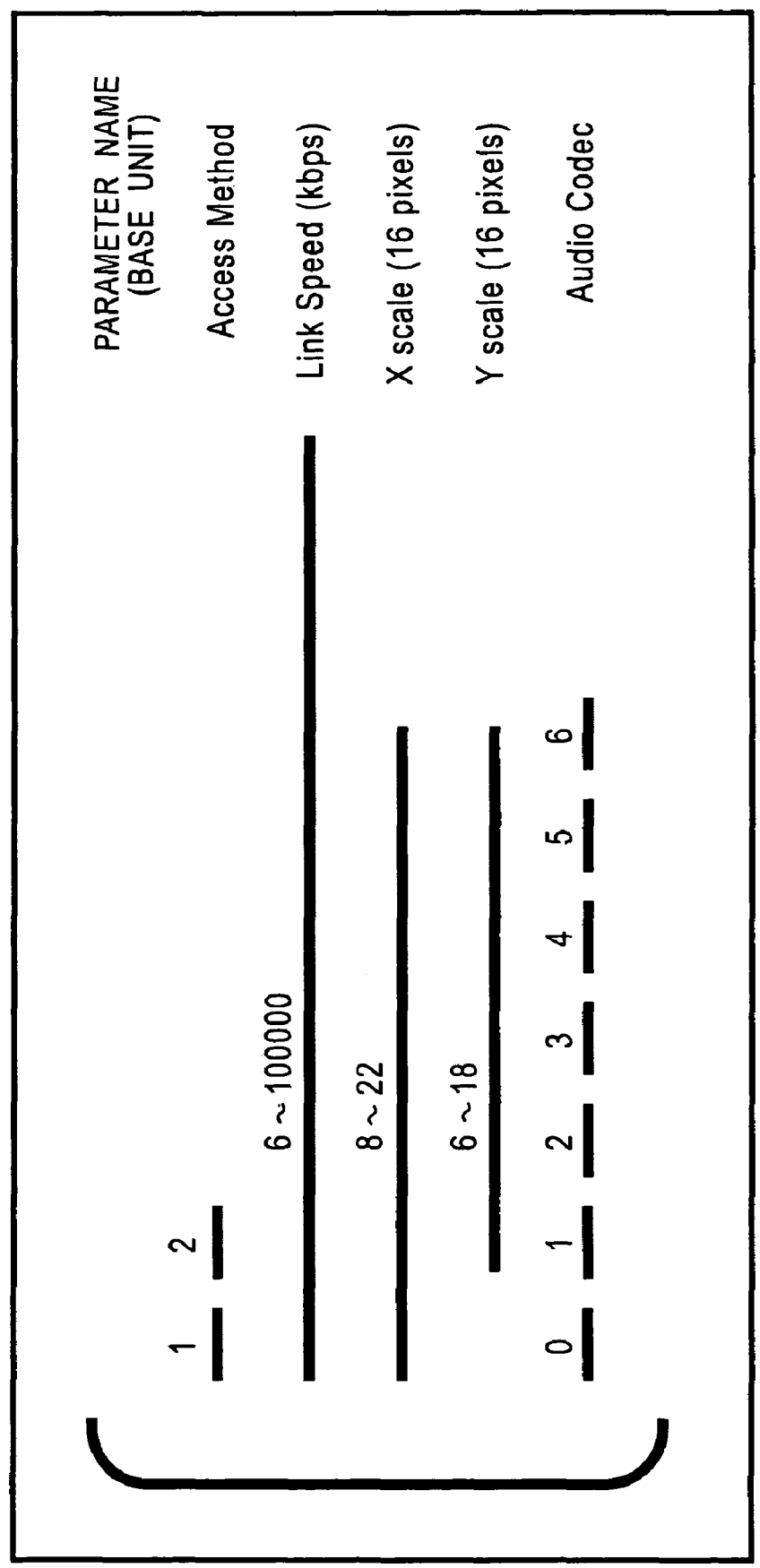
FIG. 14 is a diagram showing a base unit of a profile.

Furthermore, when a profile is described specifically, each parameter is normalized by a base unit that is predetermined as a unit of normalization. As shown in FIG. 14, the base unit for Link Speed is kbps, and the base unit for X scale and Y scale is 16 pixels. Thus, 128 pixels to 352 pixels for X scale, shown in FIG. 13, is represented as 8 to 22 when normalized by 16 pixels, and 96 pixels to 288 pixels for Y scale is represented as 6 to 18.

The standard method for describing parameters has been described above. Furthermore, customized description may be added in the form of an XML (eXtensible Markup Language) document.

Furthermore, elements constituting dimensions may be added as needed. For example, in the example shown in FIG. 13, audio codec is one of seven values represented by numbers 0 to 6. However, other elements represented by numbers 7 and 8 may be added as extension.

It is to be noted that when some elements are added, backward compatibility must be assured. That is, it is required that a device that does not have audio codec elements represented by numbers 7 and 8 be able to use a profile space with a profile space ID of "10000002". Accordingly, it is assured that each device is capable of determining content based on a profile space ID. Thus, even if the number of elements constituting each dimension is increased, each device is able to determine content based on a profile space ID (compatibility is assured), so that the profile space ID is not changed. On the other hand, if the number of dimensions is increased, each device is not allowed to determine content based on a profile space ID (compatibility is not assured), so that the profile space ID is changed.

Furthermore, according to the present invention, profiles can be created separately for a plurality of regions based on a main-factor parameter that is most likely to restrict coexistence with other parameters.

What is meant by "to restrict coexistence with other parameters" is that when a parameter takes on a certain value, combination with other parameters is inhibited. According to the present invention, link speed is a main-factor parameter.

For example, when a user is allowed to select an arbitrary value for Link Speed and an arbitrary value for audio codec, it is possible that an environment that is not actually achievable or infeasible is defined. For example, if a personal computer that is connected to an analog telephone line with a link speed below 50 kbps selects AAC 44.1 k represented by number 5 or AAC 48 k represented by number 6 as audio codec, such a relationship is actually infeasible.

Thus, according to the present invention, as shown in FIG. 15, regions are separated as a first region (region denoted as (1)) with a link speed below 50 kbps (49 kbps), as in the case of an analog telephone circuit, a second region (region denoted as (2)) with a link speed not lower than 50 kbps and below 200 kbps (not larger than 199 bps), as in the case of an ISDN (Integrated Service Digital Network) or PHS, a third region (region denoted as (3)) with a link speed not smaller than 200 kbps, such as 1.5 Mbps or 8 Mbps in the case of ADSL (Asymmetric Digital Subscriber Line). Furthermore, a fourth region (region denoted as (4)) is defined as a region in a case where link speed is not smaller than 200 kbps and where the capability of the CPU (Central Processing Unit) of the device is high.

In the example shown in FIG. 15, in the first region, access method is either 1 or 2, and link speed is 35 kbps to 49 kbps. X scale is 10, and Y scale is 7. Audio codec is either 0 or 1.

In the second region, access method is either 1 or 2, link speed is 50 kbps to 199 kbps. X scale and Y scale are 10 and 7, respectively, as in the first region. Audio codec is either 1 or 2.

In the third region, access method is either 1 or 2, link speed is 200 kbps to 100,000 kbps. X scale is 10, and Y scale is 7. Audio codec is one of 1 to 6.

In the fourth region, access method is either 1 or 2, and link speed is 200 kbps to 100,000 kbps, as in the third region. X scale is 20, and Y scale is 15. Audio codec is one of 1 to 6.

In each of the regions, each of the five-dimensional parameters is defined as a one-dimensional integer value, i.e., as a single numeric value.

The number of divisions of profiles (number of regions) may be determined arbitrarily by each service provider. Also, the value of a profile description (values of constituting elements of each dimension in each region) may be determined arbitrarily by a service provider.

It is to be noted that even when the number of regions is changed, profile space IDs are not changed.

As described above, when regions are divided into a plurality of regions based on a main-factor parameter, in each region, whatever values of the five-dimensional parameters are set by a service consumer, an environment that is infeasible or impossible is not set. Therefore, a service consumer is allowed to select a region from a plurality of regions and to select arbitrary values as appropriate from the parameters of the five dimensions in that region.

More specifically, in the processing in step S25 described earlier with reference to FIG. 5, upon receiving a provider profile (profile description) of the service provider 51, the service consumer 52 compares the values of the main-factor parameter (link speed) described in the respective regions of the provider profile with the main-factor parameter of its own consumer profile to extract a region where a match exists. As described earlier, since the main-factor parameter is represented by an integer, whether a matching range exists can be readily determined by a simple integer calculation.

When parameters are not divided into regions as opposed to the case described above, the service consumer 52 is not allowed to select an applicable service without using a program involving complex conditional branching.

As described above, a service is represented by a space constituted by M dimensional parameters. Individual spaces are identified by profile space IDs. Parameters constituting an individual space are represented by combinations of integer values and logic symbols. As logic symbols, "OR" representing selection of one of a plurality of integer values, and "range" representing a set of integer values, are used. By representing a service using such a data structure, whether a service can be used can be quickly and readily determined between a service provider that provides a service and a service consumer that receives the service (that uses the service).

Next, a process in which the service provider 51 (application #1) creates a profile (profile description) to be provided to the service consumer 52 (application #n) will be described with reference to flowcharts shown in FIGS. 16 and 17. This process corresponds to the process of assembling a provider profile in step S18 shown in FIG. 5.

Now, let it be supposed that the application #1 generates a provider profile (profile relating to its own functions) with a profile space ID of "10000002", shown in FIG. 13. Let it also be supposed that the application #1 is connected to an ADSL line of 8 Mbps, with a link speed of 4,800 as a main-factor parameter, determined from an actual throughput of the line (CurrentLinkSpeed), with a VGA (Video Graphics Array) video display system, and with a relatively low CPU processing capability.

In the steps described below, the application #1 checks it own capabilities (functions) associated with each region, and sets values corresponding to its own capabilities associated with each region. Thus, in the steps described below, specific values set to parameters are values corresponding to its own capabilities associated with each region. The application #1 may check its own capabilities in each step, or read its own capabilities checked and stored in advance.

In step S71, the application #1 sets the value "10000002" of the profile space ID currently being considered in a variable PSId for setting a parameter.

Then, in steps S72 to S78, parameters relating to the first region are set. In steps S79 to S85, parameters relating to the second region are set. In steps S86 to S92, parameters relating to the third region are set. In steps S93 to S98, parameters relating to the fourth region are set.

In step S72, the application #1 sets a value "1" in a variable PSId.region indicating that the region is the first region.

Figure 18:
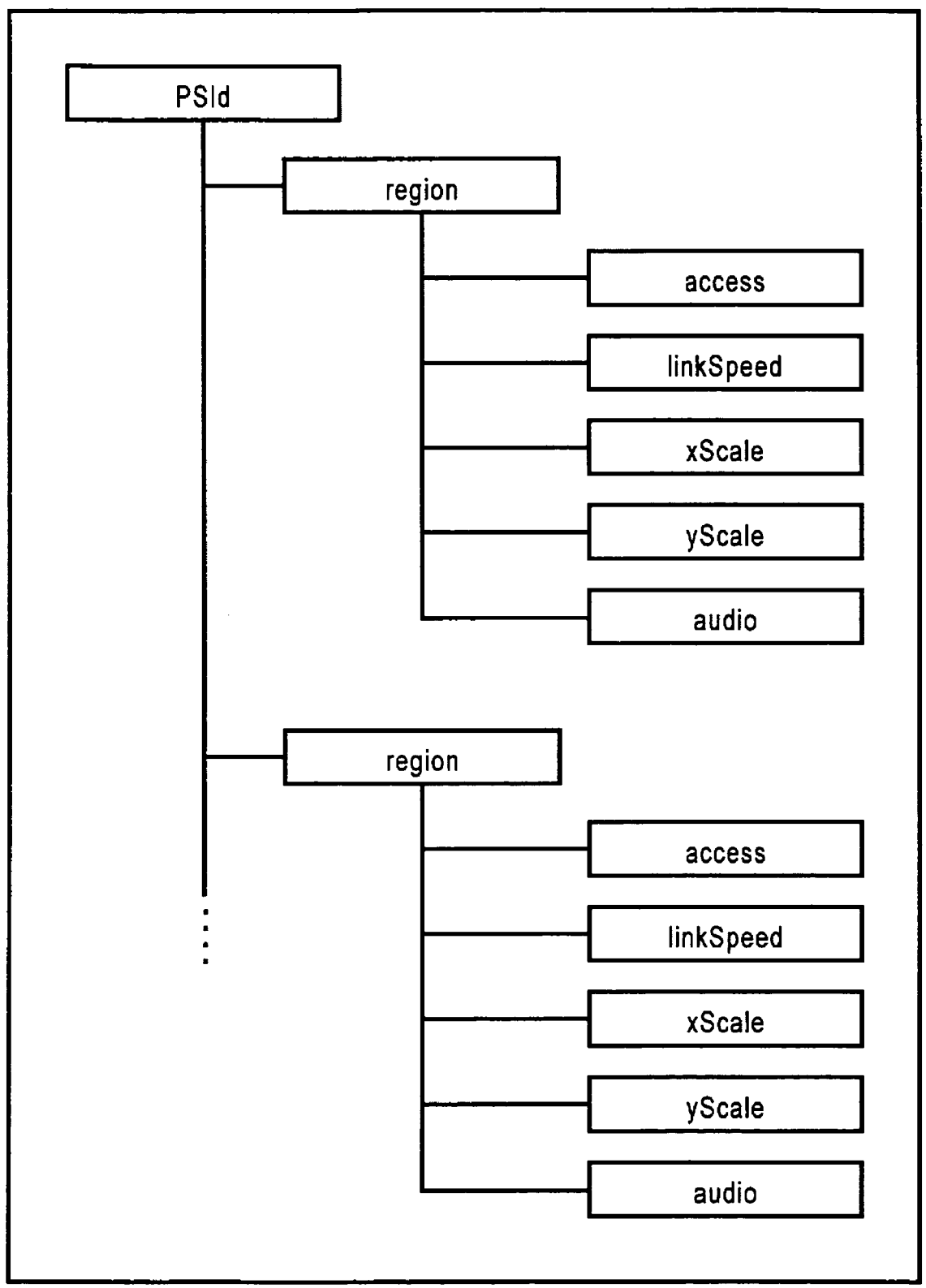
FIG. 18 is a diagram showing a hierarchical structure of a profile.

More specifically, as shown in FIG. 18, a profile with a profile space ID of "10000002" is configured under PSId (profile space ID) as a root, with each region (Region) being constituted of parameters access (Access Method), linkSpeed (Link Speed), xScale (X scale), yScale (Y scale), and audio (Audio Codec). The tree structure described above will hereinafter be described using a "." to delimit layers, such as PSId.region.access.

Thus, more specifically, "10000002.1" is set in PSId.region. In FIGS. 16 and 17, however, in order to avoid lengthy description, only parameters that are newly set are shown.

In step S73, the application #1 sets {1|2} representing 1:RTSP/TCP+RTP/UDP or 2:HTTP tunnelling as Access Method in PSId.region.access. This is because, as described earlier, the application #1 has a function for carrying out communication using "RTSP/TCP+RTP/UDP" and also has a function of carrying out communication using "HTTP tunnelling". If the application #1 only has a function of carrying out communication using "RTSP/TCP+RTP/UDP" (i.e., does not have a function of carrying out communication using "HTTP tunneling"), the application #1 sets {1} representing 1:RTSP/TCP+RTP/UDP as Access Method in PSId.region.access.

In step S74, the application #1 sets {39:49} representing 30 kbps to 49 kbps in PSId.region.linkSpeed as Link Speed. This is because the first region is being considered for processing and the default link speed for the first region is 30 kbps to 49 kbps. (Thus, as will be described later, in the processing in steps S81, S88, and S95 associated with the second to fourth regions, 50 kbps to 199 kbps, 200 kbps to 100,000 kbps, and 200 kbps to 100,000 kbps, which are default link speeds for the respective regions, are set, respectively.)

In step S75, the application #1 sets {10} representing 160 pixels in PSId.region.xScale as Xscale, and sets {7} representing 114 pixels in PSId.region.yScale as Y scale. These values are based on functions of the application #1, relating to viewing angles for displaying images.

In step S76, the application #1 sets {0|1} representing 0:none or 1:CELP 8 k as audio Codec in PSId.region.audio. This is because the application #1 supports both the functions of 0:none and 1:CELP 8 k as audio Codec.

Then, in step S77, the application #1 compares the value of current speed (Current Link Speed) representing the effective throughput of a line to which the application #1 is connected with the lower limit of the subsequent second region, i.e., 50 kbps, to determine whether the current speed is smaller than the lower limit. If the current link speed is smaller than 50 kbps, second and higher regions cannot be defined, so that the process proceeds to step S78. In step S78, the application #1 again sets {30:CurrentLinkSpeed} representing values from 30 kbps to the current link speed (CurrentLinkSpeed) in PSId.region.linkSpeed as Link Speed. That is, the value {30:49} set in the processing of step S74 is updated. Accordingly, a maximum value possible is set as a parameter.

In this case, CurrentLinkSpeed of the application #1 is 4,800 kbps, which is larger than 50 kbps. Thus, the process proceeds to step S79, in which parameters for the second region are set.

In step S79, the application #1 sets a value "2" representing the second region in PSId.region. More specifically, "10000002.2" is set in PSId.region.

In step S80, similarly to step S73, the application #1 sets {1|2} in PSId.region.access as Access Method.

In step S81, the application #1 sets {50:199} representing 50 kbps to 199 kbps in PSId.region.linkSpeed as Link Speed.

In step S82, similarly to step S75, the application #1, sets {10} in PSId.region.xScale as X Scale, and sets {7} in PSId.region.yScale as Y Scale.

In step S83, the application #1 {1|2} representing 1:CELP 8 k or 2:CELP 16 k in PSId.region.audio as Audio Codec.

In step S84, the application #1 compares the value of CurrentLinkSpeed with the lower limit of the subsequent third region, i.e., 200 kbps, to determine whether the value of CurrentLinkSpeed is smaller than the lower limit. If the value of CurrentLinkSpeed is smaller than 200 kbps, parameters for the third region cannot be set. Thus, the process proceeds to step S85, in which the application #1 again sets {50:CurrentLinkSpeed} in PSId:region:linkSpeed as Link Speed. That is, the value {50:199} set in step S81 is updated.

If it is determined in step S84 that the value of CurrentLinkSpeed is larger than 200 kbps, the process proceeds to step S86, in which parameters for the third region are set. In this case, the value of CurrentLinkSpeed is 4,800 kbps, so that the application #1 determines NO, and processing in step S86 and subsequent steps are executed.

In step S86, the application #1 sets a value "3" for the third region in PSId.region. More specifically, a value of "10000002.3" is set in PSId.region.

In step S87, similarly to step S80, the application #1 sets {1|2} in PSId.region.access as Access Method.

In step S88, the application #1 sets {200:100000} representing 200 kbps to 100,000 kbps in PSId.region.linkSpeed as Link Speed.

In step S89, similarly to step S82, the application #1 sets {10} in PSId.region.xScale as Xscale, and sets {7} in PISd.region.yScale as Y Scale.

In step S90, the application #1 sets {1|2|3|4|5|6} representing 1:CELP 8 k, 2:CELP 16 k, 3: AAC 16 k, 4: AAC 32 k, 5: AAC 44.1 k, or 6: AAC 48 k in PSId.region.audio as Audio Codec.

In step S91, the application #1 determines whether or not the capability of the CPU is low as a condition for setting parameters for the subsequent fourth region. The CPU capability is determined as low if a clock frequency thereof is lower than a predetermined reference frequency (e.g., 800 MHz) or a predetermined type of CPU (e.g., Pentium® 4).

In this case, the CPU of the application #1 has a low capability, so that step S91 evaluates to YES. Then, in step S92, Link Speed for the third region is updated. Thus, Link Speed that has been set to be {200:CurrentLinkSpeed} is again set in PSId.region.linkSpeed. That is, the value of "200: 1000000} set by the processing in step S88 is updated to a maximum value possible.

If it is determined in step S91 that the CPU capability is not low (i.e., it is high) (i.e., the clock frequency is 800 MHz or higher, or the functionality of the CPU is equivalent to that of Pentium® 4 or higher), the process proceeds to step S93, in which parameters for the fourth region are set.

In step S93, the application #1 sets a value "4" representing the fourth region in PSId.region. More specifically, "10000002.4" is set.

In step S94, similarly to step S87, the application #1 sets {1|2} in PSId.region.access as Access Method.

In step S95, similarly to step S88, the application #1 sets {200:100000} in PSId.region.linkSpeed as Link Speed.

In step S96, the application #1 sets {20} representing 320 pixels in PSId.region.xScale as X scale, and sets {15} representing 240 pixels in PSID.region.yScale as Y scale.

In step S97, similarly to step S90, the application #1 sets {1|2|3|4|5|6} in PSId.region.audio as Audio Codec.

Finally, in step S98, the application #1 again sets {200:CurrentLinkSpeed} in PSId.region.linkSpeed as Link Speed. That is, the value {200:100000} set by the processing in step S95 is updated.

FIG. 19 shows the provider profile (provider profile description) of the application #1 acting as the service provider 51, set as described above. As shown in the figure, in this case, parameters for the three regions have been set by the processing in steps S71 to S92 described above. The parameters that have been set have the values described with reference to FIGS. 16 and 17.

Figure 16:
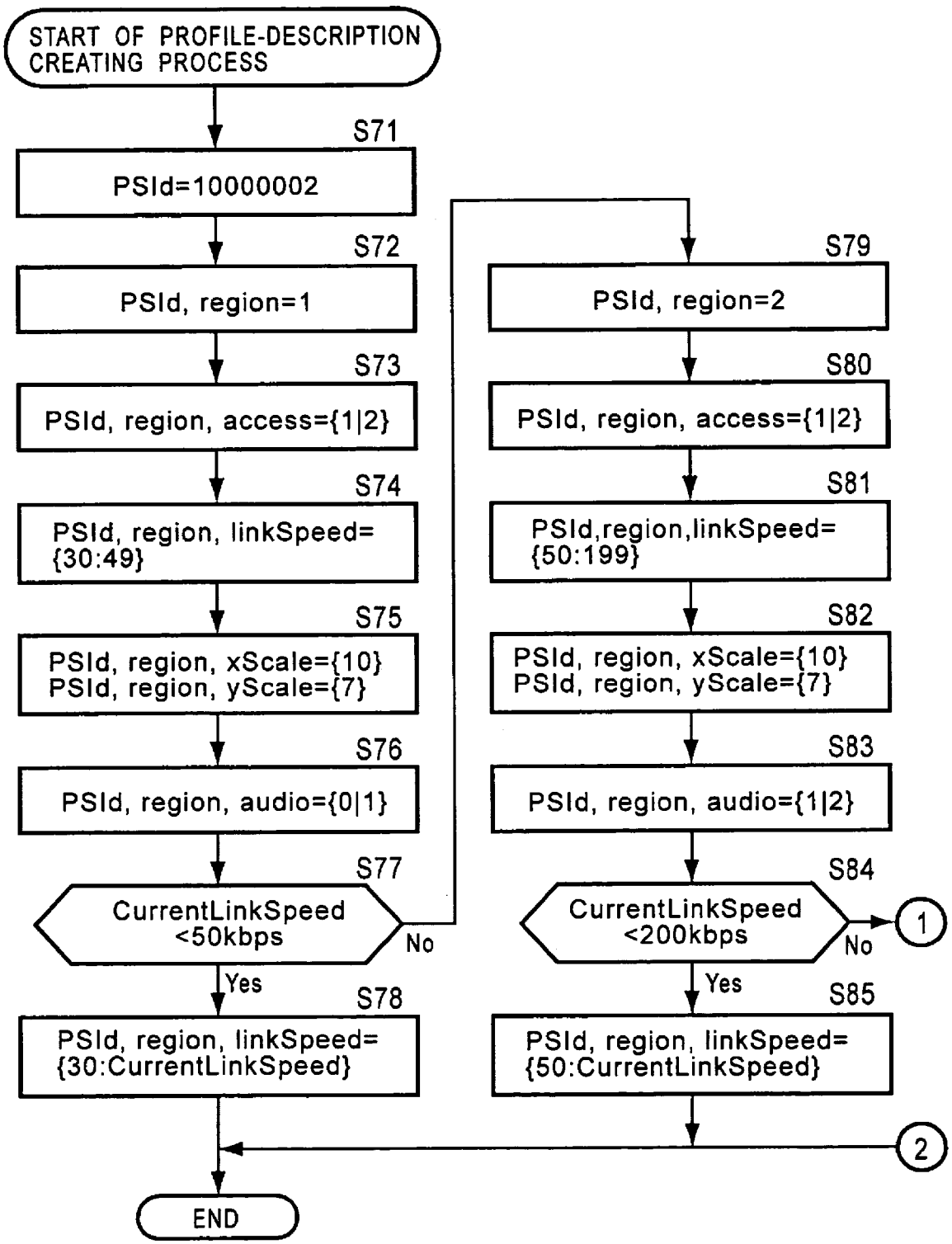
FIG. 16 is a flowchart showing a profile description creating process.
Figure 17:
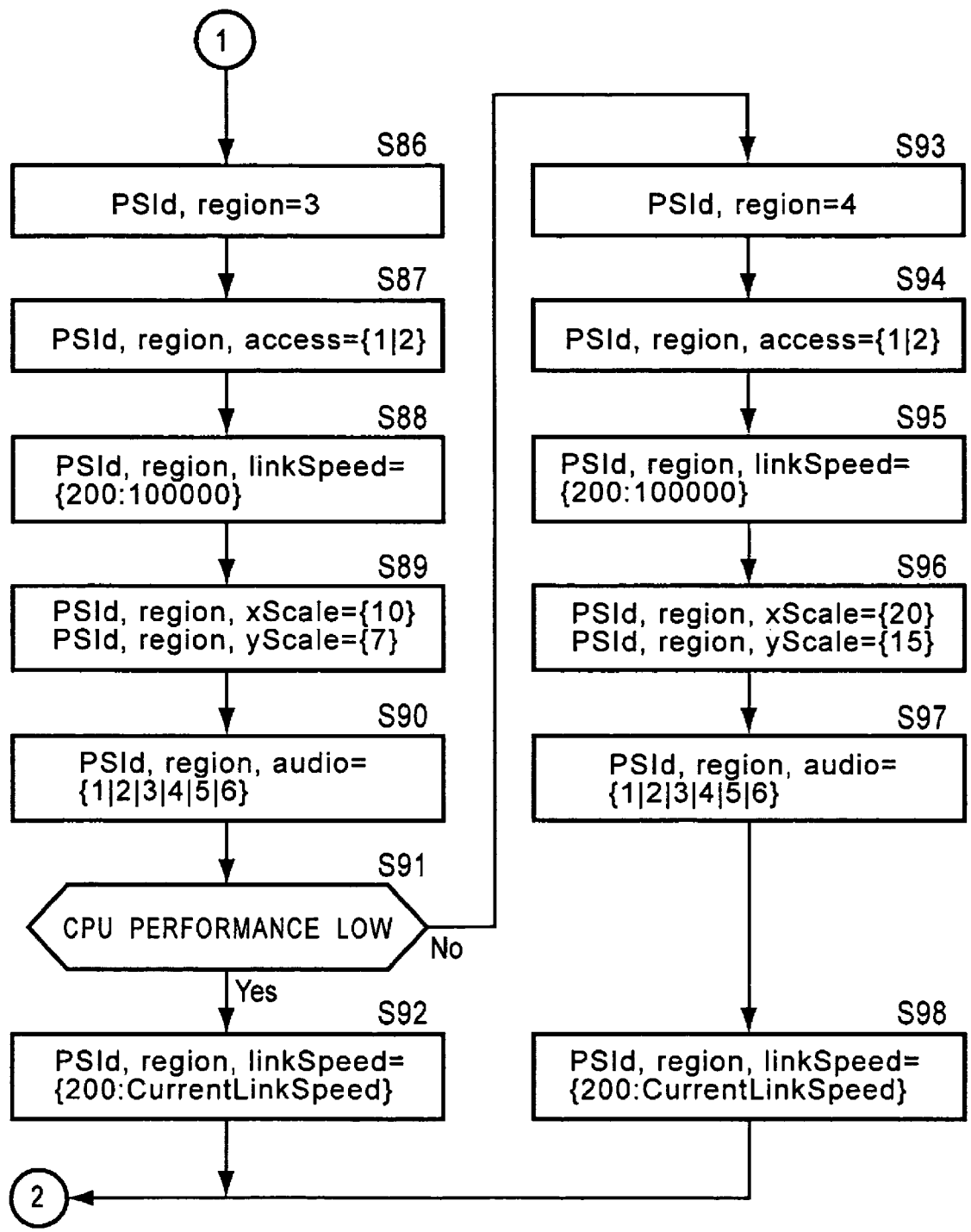
FIG. 17 is a flowchart showing a profile description creating process.

The profile description creating process shown in FIGS. 16 and 17 is also executed by the application #n acting as the service consumer 52. However, specific values of the parameters mentioned in the steps shown in FIGS. 16 and 17 are for the application #1, not for the application #n, so that values set in the steps differ.

For example, let it be supposed that the application #n acting as the service consumer 52 is connected to an ISDN line of 64 kbps, which is relatively slow, and that CurrentLinkSpeed representing the effective throughput is 48 kbps. In this case, when the profile description creating process shown in FIGS. 16 and 17 are executed, only processing for the first region in steps S71 to S78 is executed. That is, since the value of CurrentLinkSpeed (48 kbps) is smaller than 50 kbps, step S77 evaluates to YES, and processing in step S79 and subsequent steps is not executed.

That is, in this case, the application #n sets "10000002" in PSId in step S71, and sets a value "1" representing the first region in PSId.region in step S72. More specifically, "10000002.1" is set in PSId.region.

In step S73, the application #n sets {1|2} in PSId.region.access as Access Method.

In step S74, the application #n sets {30:48} in PSId.region.linkSpeed as Link Speed.

In step S75, the application #n sets {10} in PSId.region.xScale as X Scale, and sets {7} in PSId.region.yScale as Y Scale.

In step S77, the value of CurrentLinkSpeed, which is 48 kbps, is determined as smaller than 50 kbps. Thus, in step S78, the application #n again sets {30:CurrentLinkSpeed} in PSId.region.linkSpeed as Link Speed. That is, the value {30: 49} set in step S74 is updated.

FIG. 20 shows the consumer profile (consumer profile description) generated by the application #n as described above. As shown in the figure, the first region is the only region. Parameters set in this region have values set by the processing in steps S71 to S78 described above.

Figure 6:
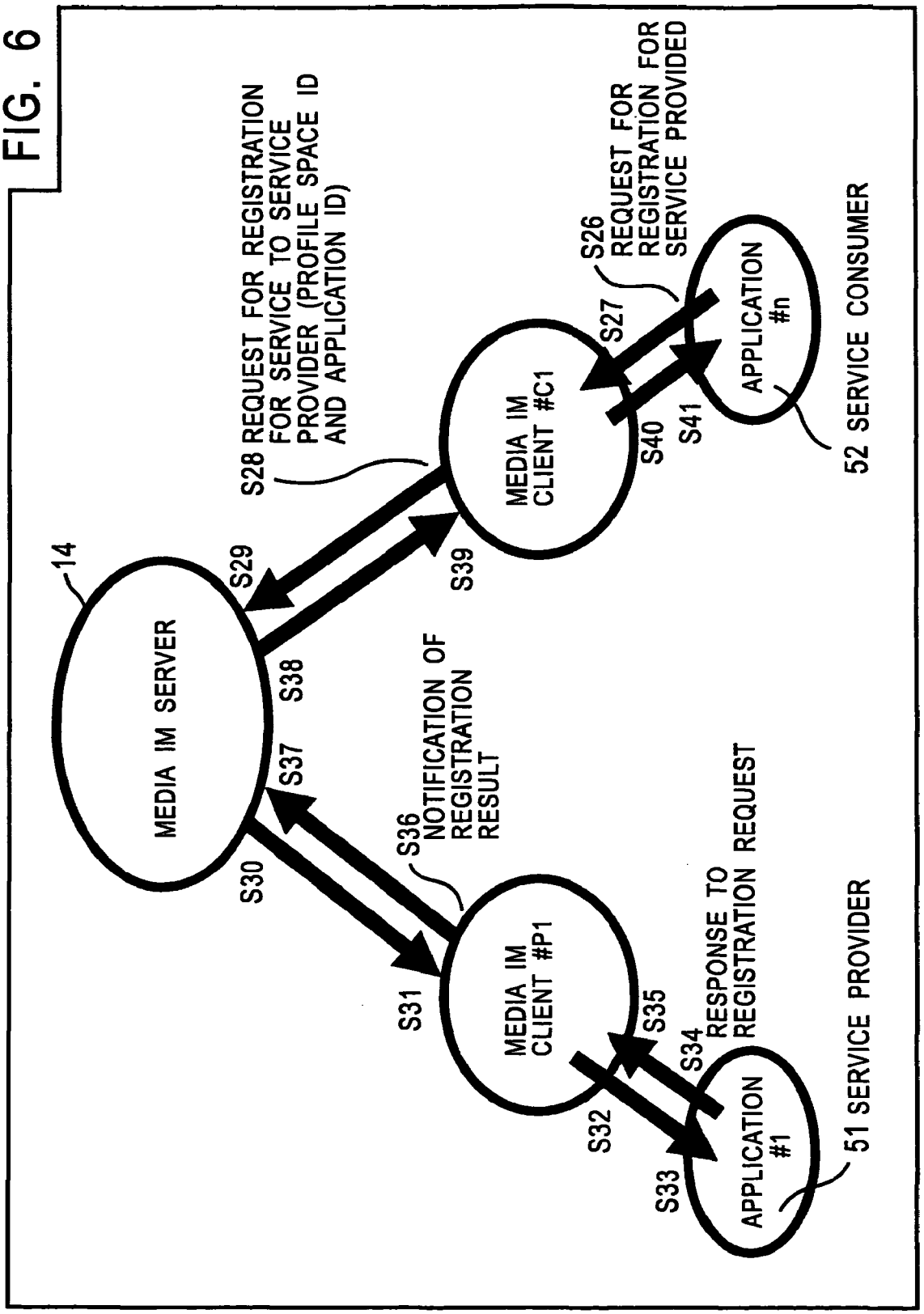
FIG. 6 is a flowchart showing an operation of the network system shown in FIG. 1.

When the application #n has the consumer profile shown in FIG. 20, upon receiving the provider profile shown in FIG. 19, transmitted from the application #1, in step S26 shown in FIG. 6, the application #n determines whether link speed 30:48 (FIG. 20) as the main-factor parameter of the consumer profile has a matching part with the value of the main parameter of the provider profile. In the provider profile shown in FIG. 19, link speed for the first region is 30:49, link speed for the second region is 50:199, and link speed for the third region is 200:4800. Thus, it is determined that a matching part (overlapping part) exists in at least one region (the first region) (the range of 30 to 49 overlaps the range of 30 to 48, at values of 30 to 48). Thus, as described above, in step S26 shown in FIG. 6, the application #n executes a registration request process for the service provided, and then creates a profile atom in step S42.

Figure 21:
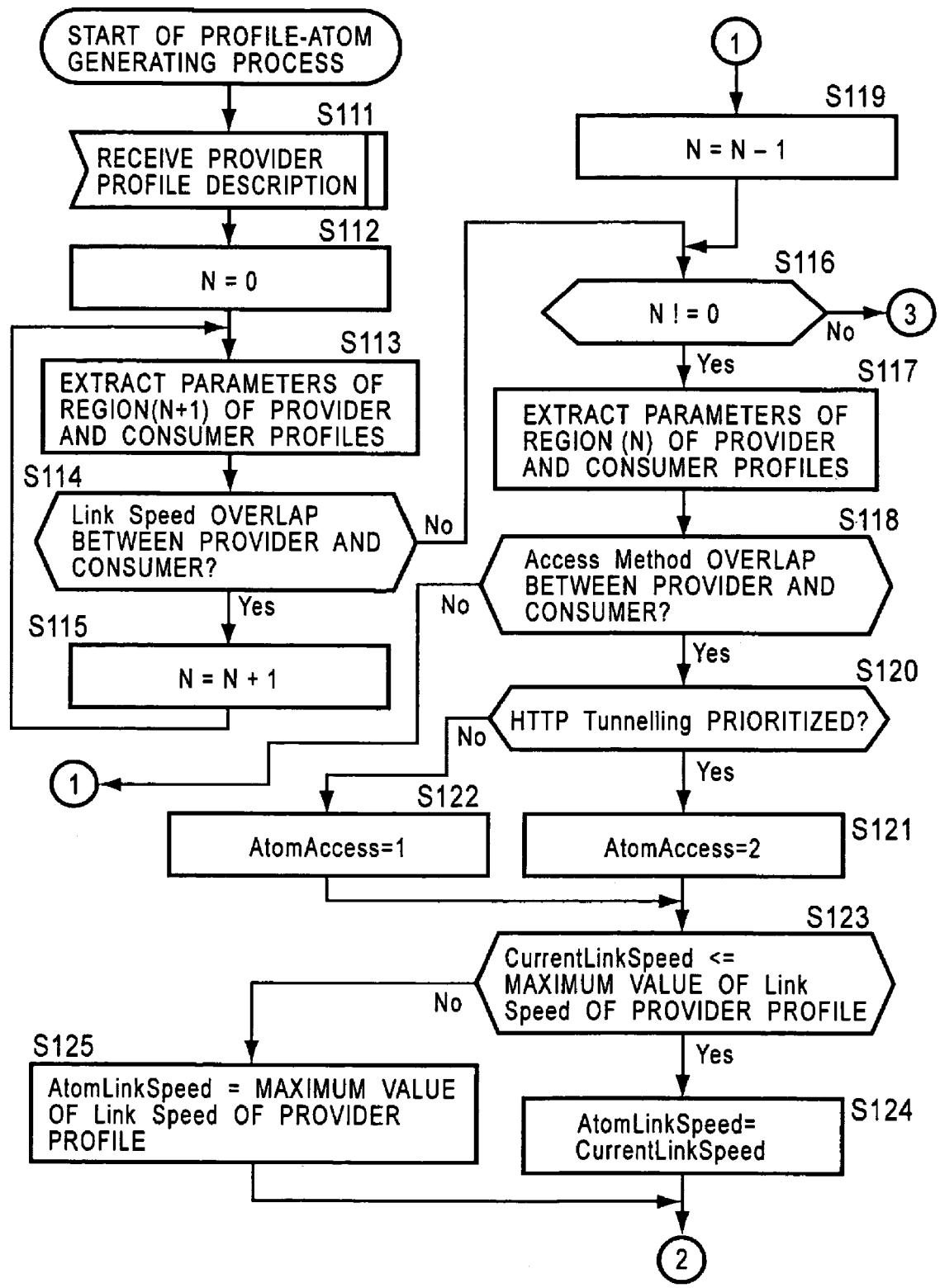
FIG. 21 is a flowchart showing a profile atom generating process.
Figure 22:
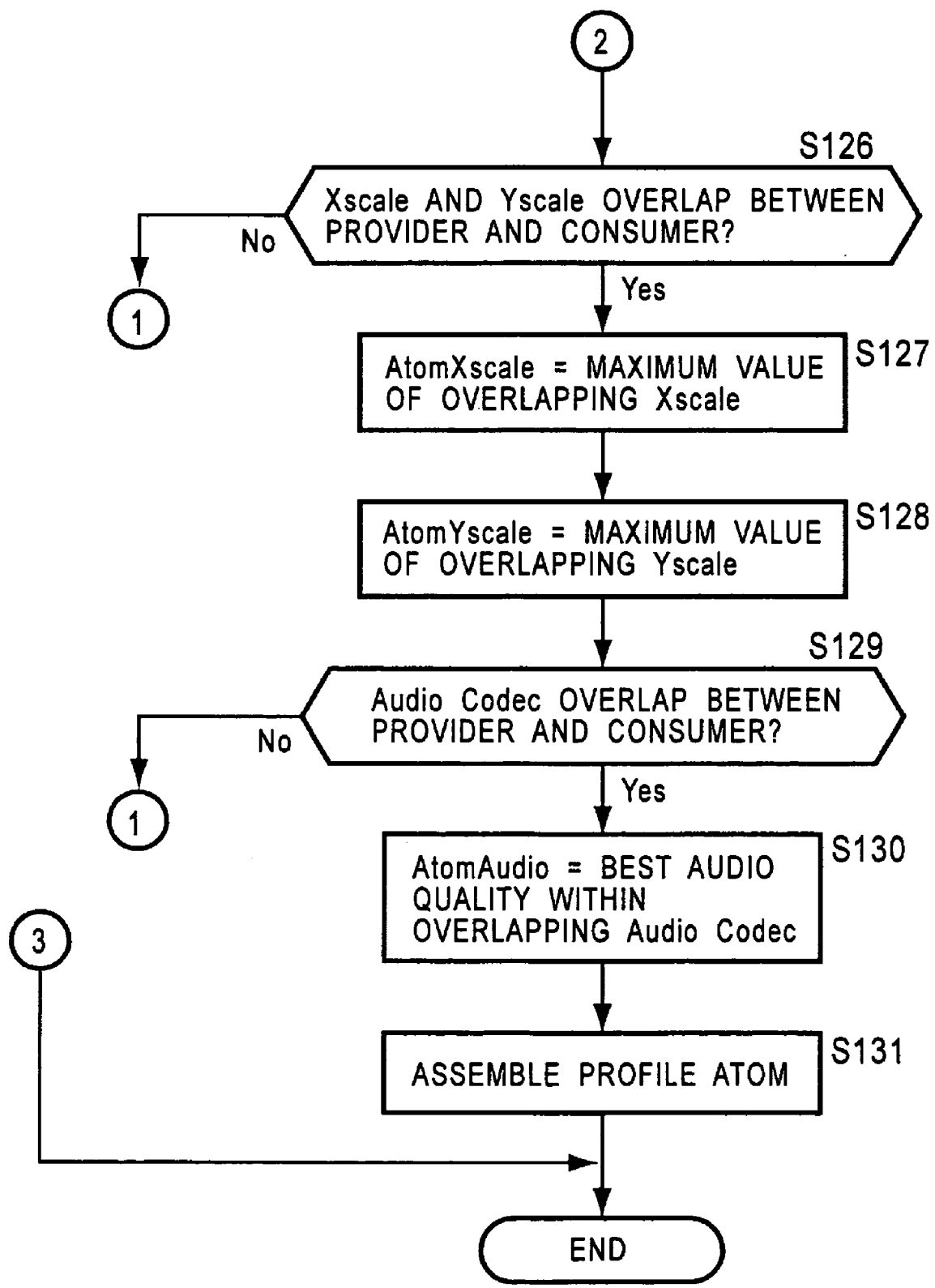
FIG. 22 is a flowchart showing a profile atom generating process.

Next, the profile atom generating process will be described with reference to flowcharts shown in FIGS. 21 and 22. This process corresponds to the processing executed in step S42 shown in FIG. 7.

In this process, first, by the processing of steps S111 to S115, a region is selected from parameter sets for respective region, presented by a service provider, with consideration of Link Speed (main-factor parameter) of a network connected to a service consumer.

More specifically, in step S111, the application #n receives the provider profile description (FIG. 19) transmitted from the application #1. This processing corresponds to the processing in step S41.

Then, in step S112, the application #n initializes an internal variable N to 0. In step S113, the application #n extracts parameters of (N+1)-th region (in this case, the first region, since N=0) from the provider profile received by the processing in step S111 and the consumer profile (FIG. 20) created by executing the processes shown in FIGS. 16 and 17.

In step S114, the application #n determines whether Link Speed of the region extracted by the processing in step S113 overlaps. In this case, it is determined whether Link Speed of the first region overlaps. If Link Speed does not overlap, the process proceeds to step S116, in which it is determined whether the value N is a value other than 0. In this case, the value N is 0, so that step S116 evaluates to NO. That is, in this case, since no region with overlapping Link Speed exists, the application #n is not allowed to communicate with the application #1. The process is then exited.

In the example shown in FIGS. 19 and 20, Link Speed for the first region in FIG. 20, i.e., 30:48, overlaps Link Speed for the first region in FIG. 19, i.e., 30:49. Thus, the process proceeds to step S115, in which the application #n increments the value of the variable N by 1 (in this case, N=1).

The process then returns to step S113, in which the application #n extracts parameters of the provider profile and the consumer profile for the (N+1)-th region (in this case, the second region, since N=1).

In step .S114, the application #n, of the parameters extracted by the processing in step S113, determines whether Link Speed overlaps. If Link Speed for the second region overlaps, the process proceeds to step S115, in which the value of the variable N is further incremented by 1 (in this case, N=2).

Then, in step S113, the provider profile and the consumer profile for the (N+1)-th region (in this case, the third region, since N=2) are read. In step S114, it is determined whether Link Speed among the parameters extracted in step S113 overlaps. If it is determined that an overlap exists, the process again proceeds to step S115, in which the value of the variable N is incremented by 1 (in this case, N=3).

As described above, all regions having overlapping Link Speed are extracted by repeatedly executing the processing in steps S113 to S115. If corresponding regions no longer exist in the provider profile and the consumer profile, or even if corresponding regions exist, if Link Speed does not overlap, the process proceeds from step S114 to step S116, in which it is determined whether the value N is a value other than 0. In this case, the value N corresponds to the number of a region having a largest number (region having highest function) among the regions having overlapping Link Speed. Thus, when at least one region having overlapping Link Speeds exists, the value N is a value other than 0.

In that case, the process proceeds to step S117, in which the application #n extracts parameters of the provider profile and the consumer profile for the N-th region. In step S118, the application #n determines whether Access Method of the provider profile and Access Method of the consumer profile, extracted by the processing in step S117, overlap.

In the example shown in FIGS. 19 and 20, Access Method for the first region is both {1|2}, so that it is determined that Access Method overlaps. If it is determined that Access Method does not overlap, the process proceeds to step S119, in which the value of the variable N is decremented by 1. That is, the region being considered for processing is changed to a region having a number that is smaller by 1. Then, in step S116, it is determined whether the value N is a value other than 0. If it is determined that the value N is not a value other than 0, i.e., the value N is 0, it indicates that a profile atom is not found after all. Then, the process is exited.

As described above, if at least one parameter without overlapping exists among the five dimensional parameters, the processing target is moved to a region with a number that is immediately below. Similarly, when it is determined that X scale and Y scale do not overlap in step S126, which will be described later, or when it is determined that Audio does not overlap in step S129, the processing target is moved to a region with a number immediately below.

In the example shown in FIGS. 19 and 20, Access Method for the first region are both {1|2}, so that the parameters overlap. Thus, the process proceeds to step S120, in which the application #n determines whether HTTP Tunnelling is selected as a priority. When a firewall exists in the path to the Internet, HTTP Tunnelling is selected as a priority.

In this case, the process proceeds to step S121, in which the application #n sets {2} in AtomAccess, which is Access Method for the profile atom (FIG. 13). On the other hand, if it is determined in step S120 that HTTP Tunnelling is not a priority, the application #n sets {1} in AtomAccess in step S122 (FIG. 13).

After the processing in step S121 or step S122, the process proceeds to step S123, in which the application #n determines whether the value of CurrentLinkSpeed is less than or equal to the maximum value of LinkSpeed in the provider profile. If the value of CurrentLinkSpeed representing the effective throughput of the line connected to the application #n is not larger than the maximum value of Link Speed parameter in the provider profile, the application #n sets the value of CurrentLinkSpeed in AtomLinkSpeed in step S124.

On the other hand, if it is determined in step S123 that the value of CurrentLinkSpeed is greater than the maximum value of Link Speed, the application #n sets the maximum value of LinkSpeed of the provider file in AtomLinkSpeed in step S125.

For example, if CurrentLinkSpeed is 48 kbps and the maximum value of LinkSpeed parameter of the provider file is 49 kbps, {48} is set in AtomLinkSpeed of the profile atom in step S125.

In step S126, the application #n determines whether X scale parameters and Y scale parameters overlap between the provider profile and the consumer profile. If overlapping does not exist between these profiles, as described earlier, the process proceeds to step S119, in which the value N is decremented by 1, and the process enters processing involving a region with a number smaller by 1.

If it is determined in step S126 that X scale parameters and Y scale overlap, in step S127, the application #n sets the maximum overlapping value of X scale in AtomXscale, which is X scale for the profile atom. Furthermore, in step S128, the application #n-sets the maximum overlapping value of Y scale in AtomYscale, which is Y scale for the profile atom.

For example, if the maximum value of X scale is 160 pixels (10×16 pixels) for both the provider profile and the consumer profile, and if the maximum value of Y scale is 112 pixels (7×16 pixels) for both the provider profile and the consumer profile, {10} is set in AtomXscale of the profile atom and {7} is set in AtomYscale of the profile atom.

In step S129, overlapping of Audio Codec between the provider profile and the consumer profile is checked. If overlapping does not exist between these profiles, as described earlier, the process proceeds to step S119, in which the value N is decremented by 1, and the process enters processing for a region with a number smaller by 1.

If it is determined in step S129 that Audio Codec overlaps between the provider profile and the consumer profile, the process proceeds to step S130. In step S130, the application #n selects the best audio quality within overlapping Audio Codec and sets it as AtomAudio, which is Audio Codec for the profile atom. In this example, Audio Codec written in profiles are numbered so that the values become larger in order of lower audio quality to higher audio quality. Thus, high audio quality is selected by selecting a largest number among overlapping Audio Codec. For example, if Audio Codec is 0: None or 1: CELP 8 k for both the provider profile and the consumer profile, {1} is set in AtomAudio of the profile atom.

In step S131, the application #n creates (assembles) a profile atom based on the values of parameters of the profile atom, determined by the processing in the steps described above.

Figure 7:
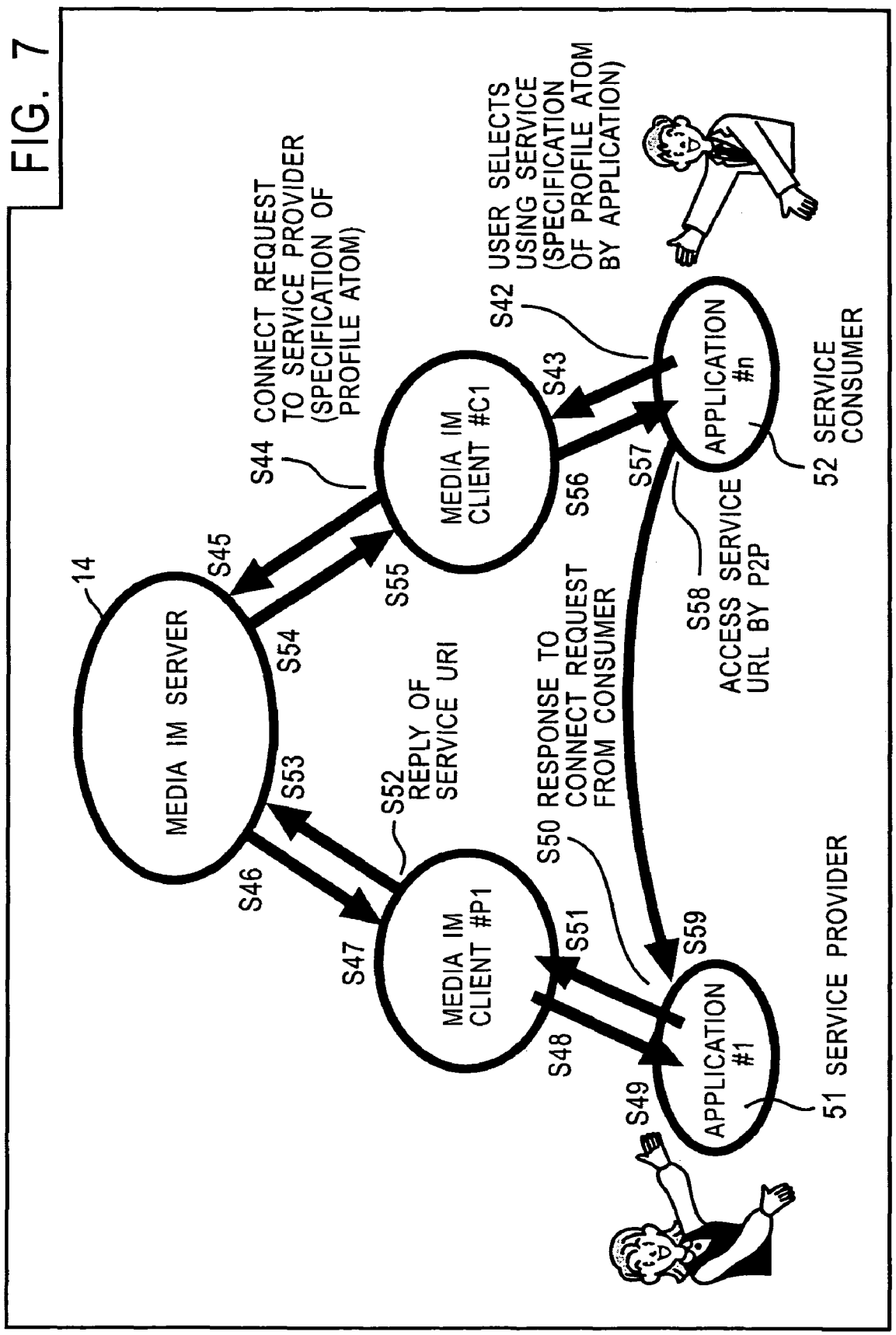
FIG. 7 is a flowchart showing an operation of the network system shown in FIG. 1.

By the processing in step S42 shown in FIG. 7, the application #1 is notified of the profile atom generated as described above.

As described above, according to the present invention, M-dimensional parameters relating to a service, the parameters being represented as numeric values, are obtained, and detailed information representing content of the service by the parameters is generated. Accordingly, the content of the service can be readily recognized, so that two apparatuses are allowed to exchange information quickly and reliably via a network.

By normalizing the parameters by base units, detailed information can be represented by smaller values. This facilitates processing for comparison.

By dividing the parameters into a plurality of regions, parameters that allow information to be actually transferred simply without using a complex algorithm can be selected.

By representing the parameters as one-dimensional values, the parameters can be readily compared.

By representing detailed information using a combination of integer values and logic symbols, parameters can be represented in a format that readily allows comparison.

By using, as logic symbols, a first symbol representing selection of one of the plurality of integer values and a second symbol representing a set of the integer values, parameters can be represented in a format that readily allows comparison.

By using, as the second symbol, a start value representing a start of a range, an end value representing an end of the range, and a step defining a change width between the start value and the end value, the range can be represented in a format that readily allows comparison.

When service is a service of sending or receiving data via a network, information needed by two apparatuses for exchanging information quickly and reliably can be exchanged.

By attaching an identifier to detailed information, the detailed information can be readily identified.

By sending an identifier to a destination via a network, the destination is allowed to readily identify detailed information.

By sending detailed information associated with an identifier to a destination and receiving M-dimensional parameters sent from the destination, detailed information need not be sent from the beginning, allowing reliable exchange of information while efficiently using the transmission path.

By receiving an identifier sent via a network, detailed information can be readily recognized.

By requesting sending of detailed information associated with an identifier received, useless exchange of detailed information with a party with which communication is not possible is prevented.

By using a data structure including M-dimensional parameters and representing the parameters by combinations of integer values and logic symbols, data can be described in a format such that content can be readily recognized.

Although M:5 in the above description, the dimensions may be larger or smaller than that.

Furthermore, although the above description has been made in the context of an example of a service of providing AV data, the present invention can be applied to cases where various services are provided and used as well as the service of providing AV data.

The processing described above may be executed by hardware in the case of network-enabled CE equipment or the like. Obviously, the processing may be executed by software.

When the series of processes are executed by software, programs constituting the software are installed from a network or a recording medium onto a computer included in special hardware, a general-purpose computer or the like that is capable of executing various functions with various programs installed thereon.

The recording medium may be a package media carrying the programs, provided to a user for providing programs separately from a main unit of the apparatus, such as a magnetic disk 141 (including a floppy disk), an optical disk 142 (including a CD-ROM (Compact Disk-Read Only Memory) and a DVD (Digital Versatile Disk)), a magneto-optical disk 143 (including an MD (Mini-Disk)), or a semiconductor memory 144. Alternatively, the recording medium may be the ROM 122 or a hard disk included in the storage unit 128, carrying the programs, provided as included in advance in the main unit of the apparatus.

In this specification, steps defining the programs recorded on the recording medium may include processes that are executed sequentially in the orders described, and also include processes that are executed in parallel or individually, not necessarily sequentially.

In this specification, a system refers to the entirety of apparatuses constituted of a plurality of apparatuses.

INDUSTRIAL APPLICABILITY

As described hereinabove, according to a first invention, information representing content of a service can be generated. In particular, detailed information that allows content of a service to be readily confirmed can be generated. Accordingly, it is assured that content of a service is communicated to the other party, serving to form a connection with an apparatus of the other party quickly and reliably and to exchange data.

According to a second invention, content of a service can be represented. In particular, content of a service can be represented such that it can be readily confirmed. Accordingly, it becomes possible to confirm content of a service reliably, serving to form a connection with an apparatus of the other party quickly and reliably and to exchange data.

The invention claimed is:

1. A computer program product comprising a computer storage medium storing a computer program code mechanism which when executed by a computer, causes the computer to perform a method, comprising:

obtaining multi-dimensional parameters relating to a service of sending or receiving data via a network, the parameters being represented as numeric values normalized by base units and indicating capabilities of another computer remote from the computer, wherein the parameters include at least a link speed relating to the service of sending or receiving data via the network and a horizontal and vertical size of a display of the another computer, and the base units are kilobits per second (kbps) corresponding to the link speed parameter, and a number of pixels corresponding to each of the horizontal and vertical size of the display of the another computer; and generating detailed information representing content of the service of sending or receiving data via the network by the parameters obtained, wherein the detailed information represents capabilities of the another computer and is employed for confirming availability of the service of sending or receiving data via the network.

2. The computer program product according to claim 1, wherein the obtaining step divides the parameters into a plurality of regions based on a main-factor parameter that restricts coexistence with other parameters, and obtains the parameters for each of the regions.

3. The computer program product according to claim 2, wherein the obtaining step obtains the multi-dimensional parameters for each of the regions as one-dimensional integer values, respectively.

4. The computer program product according to claim 3, wherein the generating step represents the detailed information by a combination of the integer values and logic symbols.

5. The computer program product according to claim 4, wherein the generating step uses a first symbol representing selection of one of the plurality of integer values and a second symbol representing a set of the integer values.

6. The computer program product according to claim 5, wherein the generating step uses, as the second symbol, a start value representing a start of a range, an end value representing an end of the range, and a step defining a change width between the start value and the end value.

7. The computer program product according to claim 1, further comprising the steps of:
    obtaining an identifier for identifying the service of sending or receiving data via the network; and
    adding the identifier to the detailed information representing content of the service of sending or receiving data via the network.

8. The computer program product according to claim 7, further comprising:
    a first sending step of sending the identifier to a specified destination via the network.

9. An information processing method for an information processing apparatus, comprising:
    obtaining multi-dimensional parameters relating to a service of sending or receiving data via a network, the parameters being represented as numeric values normalized by base units and indicating capabilities of another computer remote from the computer, wherein the parameters include at least a link speed relating to the service of sending or receiving data via the network and a horizontal and vertical size of a display of the another computer, and the base units are kilobits per second (kbps) corresponding to the link speed parameter, and a number of pixels corresponding to each of the horizontal and vertical size of the display of the another computer; and
    generating detailed information representing content of the service of sending or receiving data via the network by the parameters obtained, wherein the detailed information represents capabilities of the another computer and is employed for confirming availability of the service of sending or receiving data via the network.

10. An information processing apparatus comprising:
    an interface configured to obtain multi-dimensional parameters relating to a service of sending or receiving data via a network, the parameters being represented as numeric values normalized by base units and indicating capabilities of another computer remote from the computer, wherein the parameters include at least a link speed relating to the service of sending or receiving data via the network and a horizontal and vertical size of a display of the another computer, and the base units are kilobits per second (kbps) corresponding to the link speed parameter, and a number of pixels corresponding to each of the horizontal and vertical size of the display of the another computer; and
    a processor configured to generate detailed information representing content of the service of sending or receiving data via the network by the parameters obtained, wherein the detailed information represents capabilities of the another computer and is employed for confirming availability of the service of sending or receiving data via the network.

* * * * *